US009600168B2

(12) United States Patent
Kang et al.

(10) Patent No.: US 9,600,168 B2
(45) Date of Patent: Mar. 21, 2017

(54) MOBILE TERMINAL AND DISPLAY CONTROLLING METHOD THEREOF

(75) Inventors: Rae Hoon Kang, Seoul (KR); Seung Hyun Woo, Seoul (KR); Min Jeong Lee, Seoul (KR); Hyun Ho Jee, Incheon-si (KR); Dong Gwan Im, Seoul (KR); Choon Jae Lee, Gwangju-si (KR)

(73) Assignee: LG ELECTRONICS INC., Seoul (KR)

( * ) Notice: Subject to any disclaimer, the term of this patent is extended or adjusted under 35 U.S.C. 154(b) by 759 days.

(21) Appl. No.: 12/770,621

(22) Filed: Apr. 29, 2010

(65) Prior Publication Data

US 2011/0061021 A1   Mar. 10, 2011

(30) Foreign Application Priority Data

Sep. 9, 2009  (KR) .......................... 10-2009-0084850

(51) Int. Cl.
*G06F 3/048* (2013.01)
*G06F 3/0488* (2013.01)
(Continued)

(52) U.S. Cl.
CPC .......... *G06F 3/0488* (2013.01); *G06F 3/0481* (2013.01); *G06F 3/0482* (2013.01);
(Continued)

(58) Field of Classification Search
CPC .. G06F 3/0481; G06F 3/0482; G06F 3/04883; G06F 3/0488; G06F 2203/04806;
(Continued)

(56) References Cited

U.S. PATENT DOCUMENTS 5,838,318 A * 11/1998 Porter .................. G06F 3/0481
715/790
5,847,708 A * 12/1998 Wolff ................... G06F 3/0481
707/E17.111

(Continued)

FOREIGN PATENT DOCUMENTS

EP          1835385      9/2007
EP          1990711      11/2008
(Continued)

OTHER PUBLICATIONS

European Patent Office Application Serial No. 10009137.0, Search Report dated Apr. 8, 2013, 14 pages.

(Continued)

*Primary Examiner* — David Harvey
(74) *Attorney, Agent, or Firm* — Lee Hong Degerman Kang & Waimey

(57) ABSTRACT

A mobile terminal is presented. The mobile terminal includes a touchscreen configured to display at least one or more data link items, the touchscreen receiving an input for a preview of a first data link item from the at least one or more data link items, and a controller configured to control the touchscreen to display a first display window for displaying a first data associated with the first data link item on a predetermined region of the touchscreen after receiving the input for the preview of the first data link item, and further configured to adjust a size for the first display window after receiving an input associated with a size adjusting signal.

5 Claims, 32 Drawing Sheets

(51) Int. Cl.
*G06F 3/0481* (2013.01)
*G06F 3/0482* (2013.01)
*G11B 27/34* (2006.01)

(52) U.S. Cl.
CPC .............. *G06F 3/04883* (2013.01); *G06F 2203/04806* (2013.01); *G11B 27/34* (2013.01)

(58) Field of Classification Search
CPC ............ G06F 3/04882; G06F 3/04817; G06Q 10/107
USPC .......................................... 715/800; 345/173
See application file for complete search history.

(56) References Cited

U.S. PATENT DOCUMENTS

| | | | | |
|---|---|---|---|---|
| 5,892,511 | A * | 4/1999 | Gelsinger | G06F 3/0481 715/790 |
| 6,275,858 | B1 * | 8/2001 | Bates et al. | 709/228 |
| 6,292,185 | B1 * | 9/2001 | Ko | G06T 1/00 715/763 |
| 6,456,307 | B1 * | 9/2002 | Bates | G06F 3/0481 715/779 |
| 6,686,938 | B1 * | 2/2004 | Jobs | G06F 3/0481 715/769 |
| 7,681,143 | B2 * | 3/2010 | Lindsay et al. | 715/788 |
| 7,781,710 | B2 * | 8/2010 | Higashino | 250/201.2 |
| 7,924,271 | B2 * | 4/2011 | Christie et al. | 345/173 |
| 7,934,161 | B1 * | 4/2011 | Denise | 715/738 |
| 8,019,390 | B2 * | 9/2011 | Sindhu | 455/566 |
| 8,028,227 | B1 * | 9/2011 | Mahan | H04W 4/185 715/201 |
| 8,253,695 | B2 * | 8/2012 | Ganatra et al. | 345/173 |
| 9,177,298 | B2 * | 11/2015 | Haynes | G06F 3/0481 |
| 2002/0087731 | A1 * | 7/2002 | Morrison et al. | 709/248 |
| 2002/0089535 | A1 * | 7/2002 | Morrell, Jr. | G06F 17/30876 715/738 |
| 2003/0119562 | A1 | 6/2003 | Kokubo | |
| 2003/0233425 | A1 * | 12/2003 | Lyons et al. | 709/217 |
| 2004/0201614 | A1 * | 10/2004 | Genty et al. | 345/738 |
| 2005/0273723 | A1 * | 12/2005 | Sharpe | 715/764 |
| 2006/0005146 | A1 * | 1/2006 | Arcas | 715/802 |
| 2006/0064716 | A1 * | 3/2006 | Sull | G06F 17/30793 725/37 |
| 2006/0129948 | A1 * | 6/2006 | Hamzy | G06F 21/84 715/790 |
| 2006/0136421 | A1 * | 6/2006 | Muthukrishnan | H04L 47/10 |
| 2006/0248471 | A1 * | 11/2006 | Lindsay et al. | 715/800 |
| 2006/0277491 | A1 * | 12/2006 | Kaneko | 715/788 |
| 2007/0162298 | A1 * | 7/2007 | Melton et al. | 705/1 |
| 2007/0180398 | A1 * | 8/2007 | McArdle | G06F 3/0481 715/781 |
| 2007/0252821 | A1 * | 11/2007 | Hollemans et al. | 345/173 |
| 2008/0052637 | A1 * | 2/2008 | Ben-Yoseph | G06F 3/0481 715/800 |
| 2008/0094369 | A1 | 4/2008 | Ganatra et al. | |
| 2008/0309632 | A1 * | 12/2008 | Westerman | G06F 3/038 345/173 |
| 2009/0178006 | A1 * | 7/2009 | Lemay et al. | 715/835 |
| 2009/0232289 | A1 * | 9/2009 | Drucker | G06Q 10/1091 379/114.03 |
| 2009/0293007 | A1 * | 11/2009 | Duarte | G06F 3/0481 715/767 |
| 2009/0313100 | A1 * | 12/2009 | Ingleshwar | 705/14.25 |
| 2009/0319574 | A1 * | 12/2009 | Burgard et al. | 707/104.1 |
| 2010/0070575 | A1 * | 3/2010 | Bergquist et al. | 709/203 |
| 2010/0313156 | A1 * | 12/2010 | Louch | G06F 3/0481 715/769 |
| 2013/0346588 | A1 * | 12/2013 | Zhang | H04L 43/08 709/224 |

FOREIGN PATENT DOCUMENTS

| | | |
|---|---|---|
| EP | 2071445 | 6/2009 |
| KR | 10-2007-0093585 | 9/2007 |
| KR | 10-2008-0002811 | 1/2008 |
| KR | 10-0844070 | 7/2008 |
| WO | 2006020305 | 2/2006 |
| WO | 2010035180 | 4/2010 |

OTHER PUBLICATIONS

European Patent Office Application Serial No. 10009137.0, Search Report dated Feb. 7, 2013, 5 pages.

* cited by examiner

FIG. 8
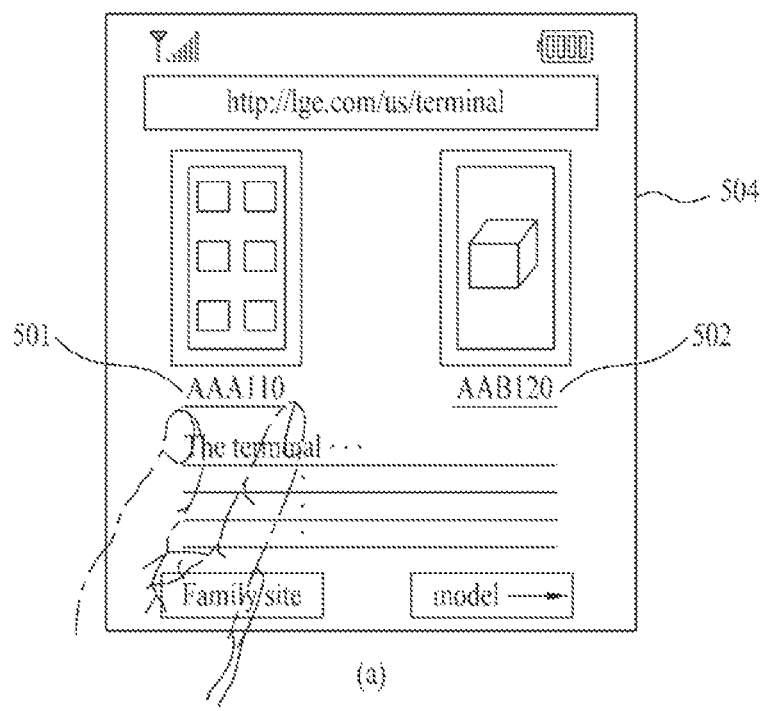
(a)
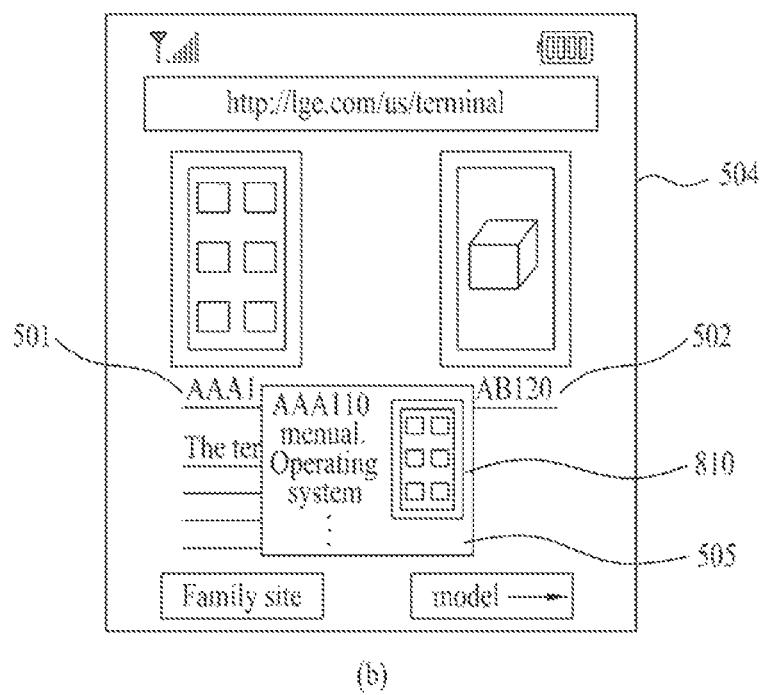
(b)

FIG. 9A
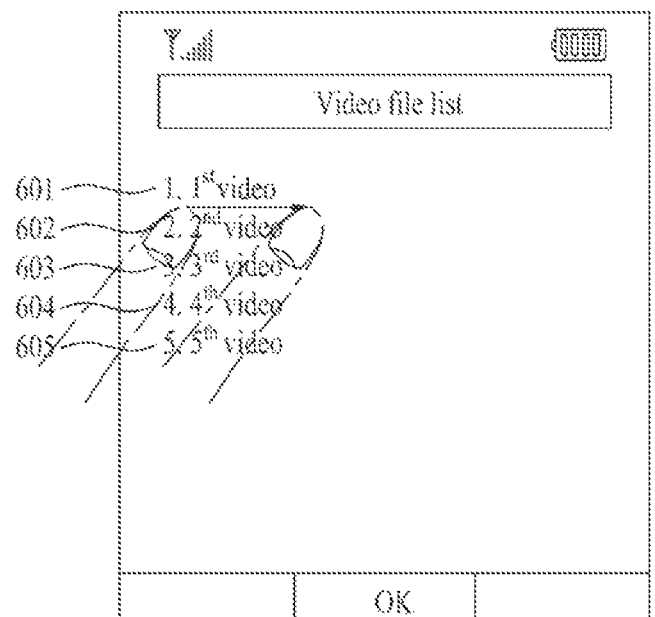
(a)
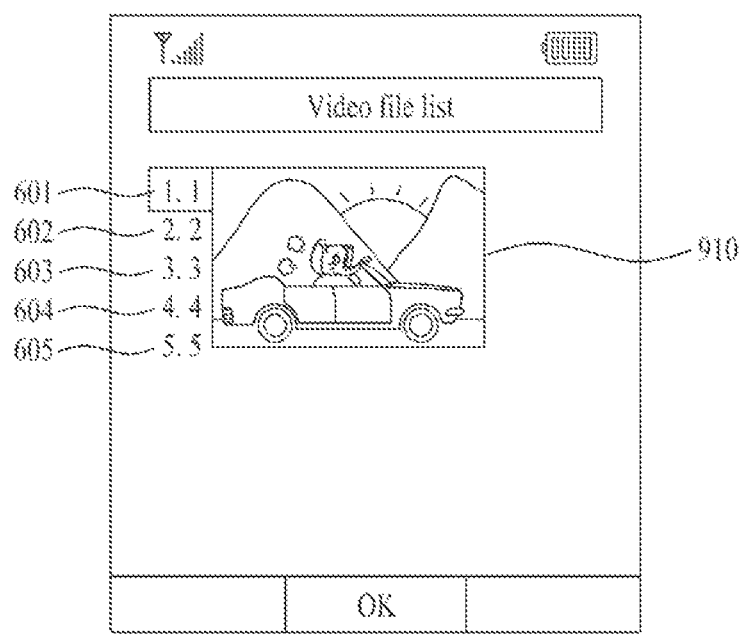
(b)

FIG. 9B
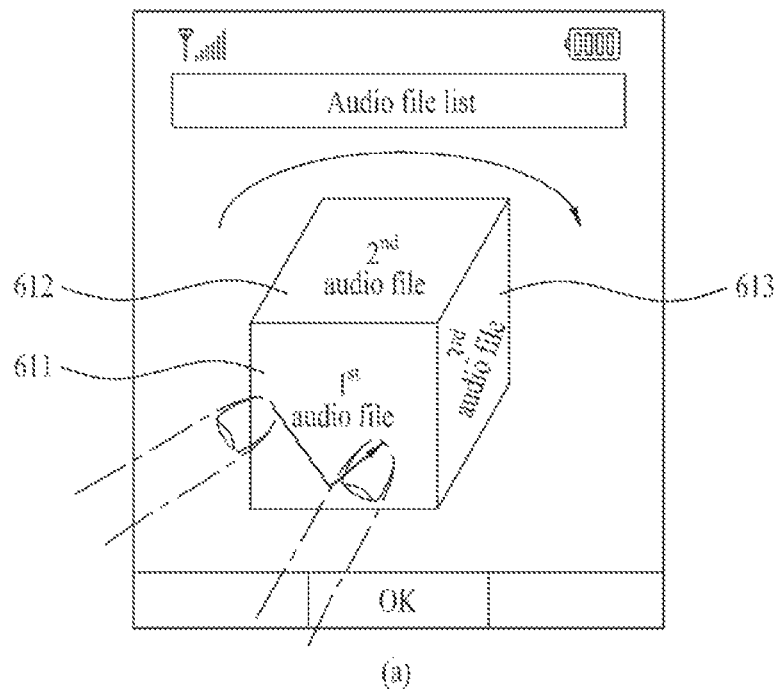
(a)
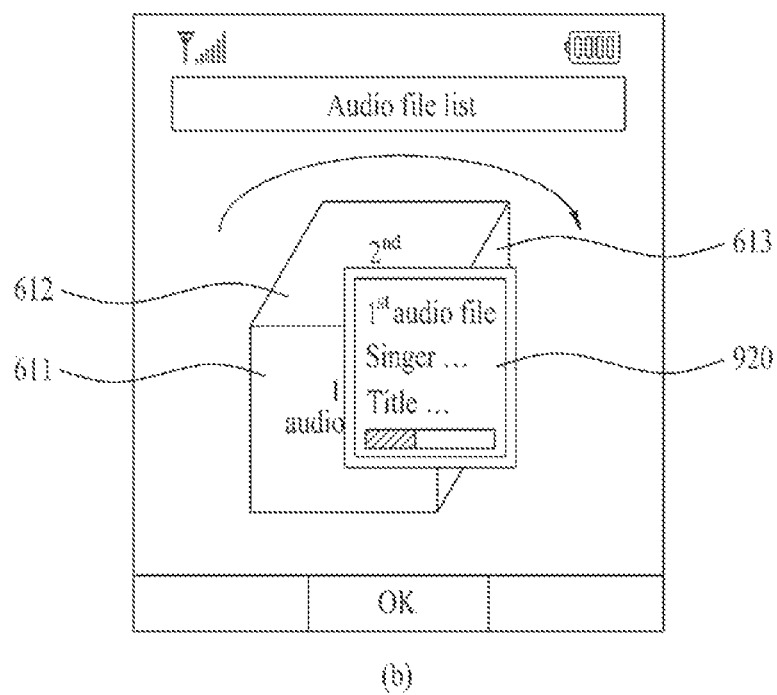
(b)

FIG. 9C
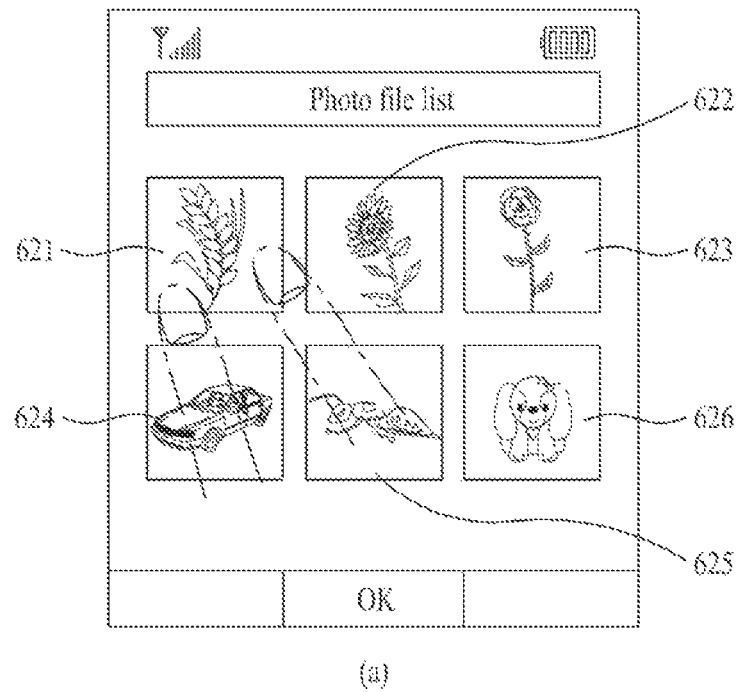
(a)
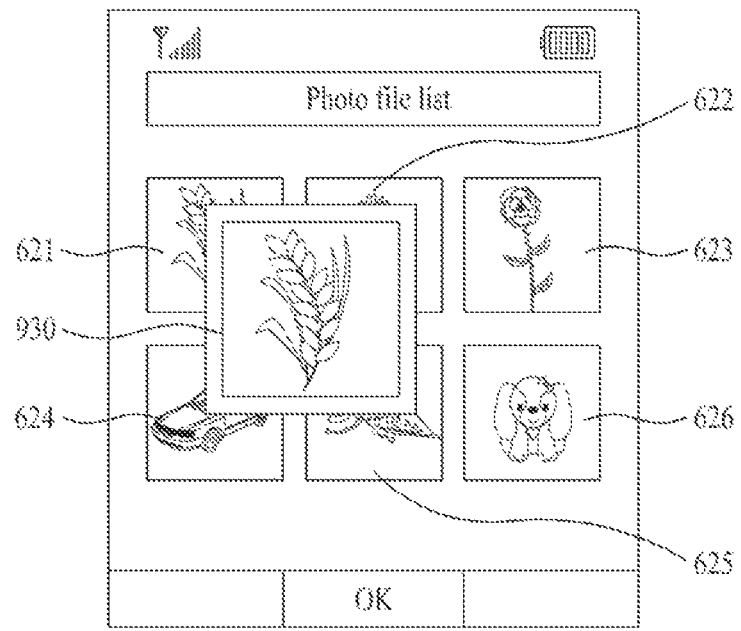
(b)

FIG. 10A
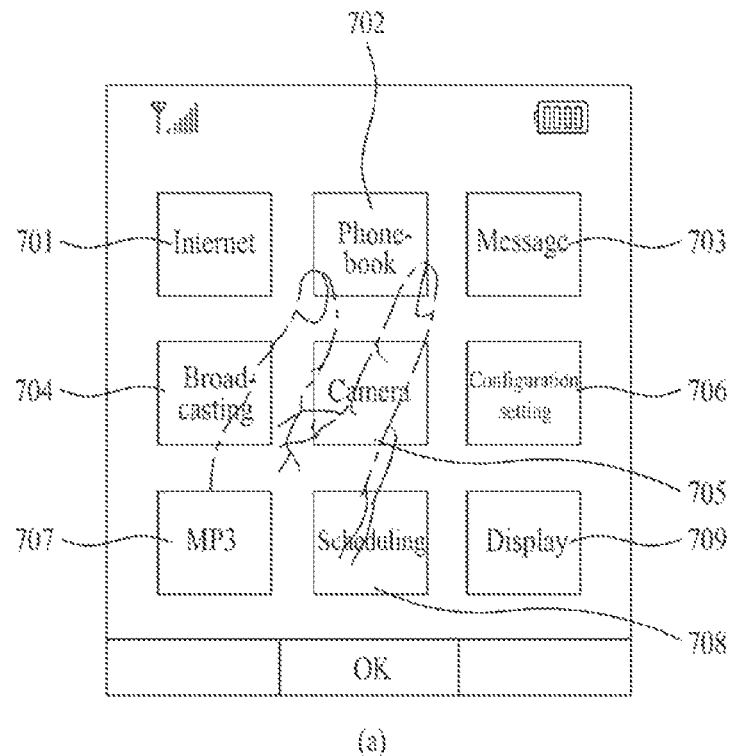
(a)
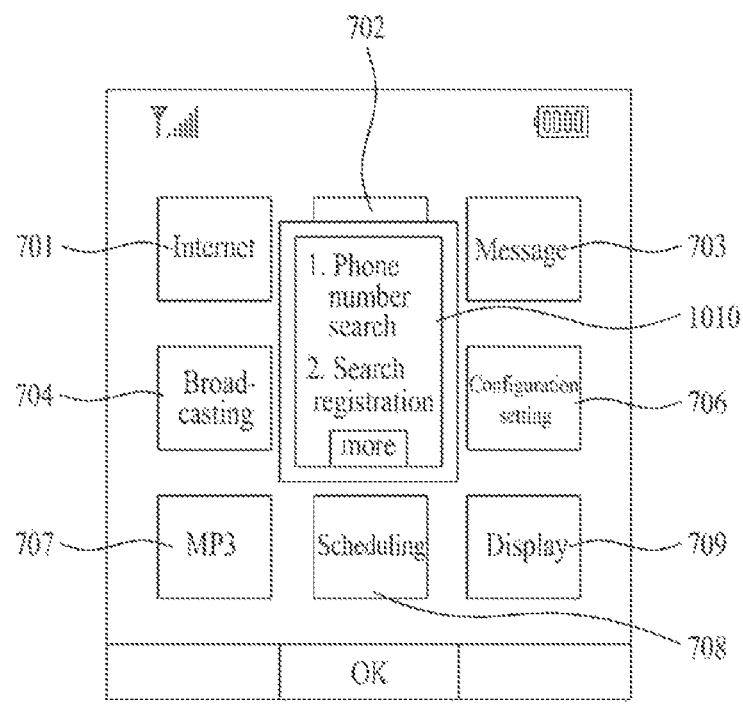
(b)

FIG. 10B
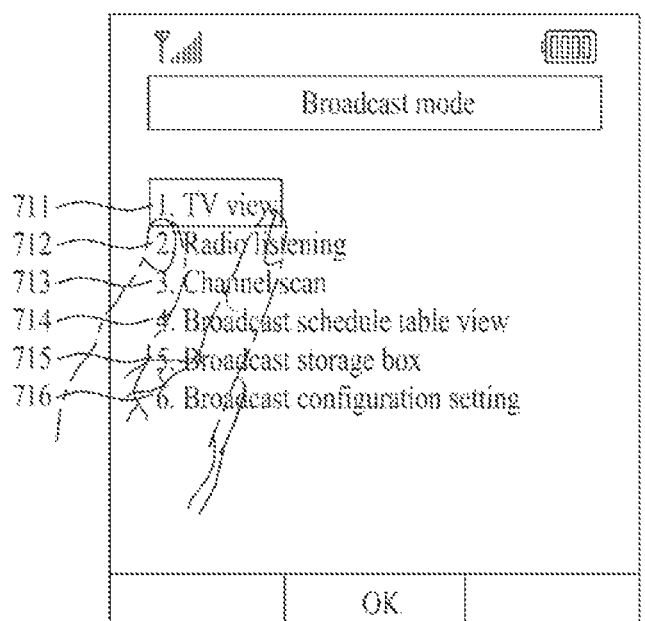
(a)
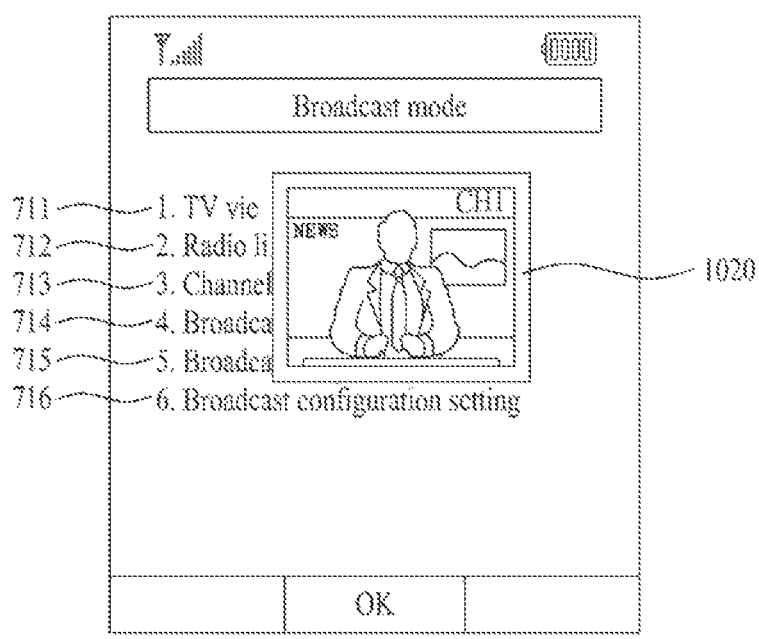
(b)

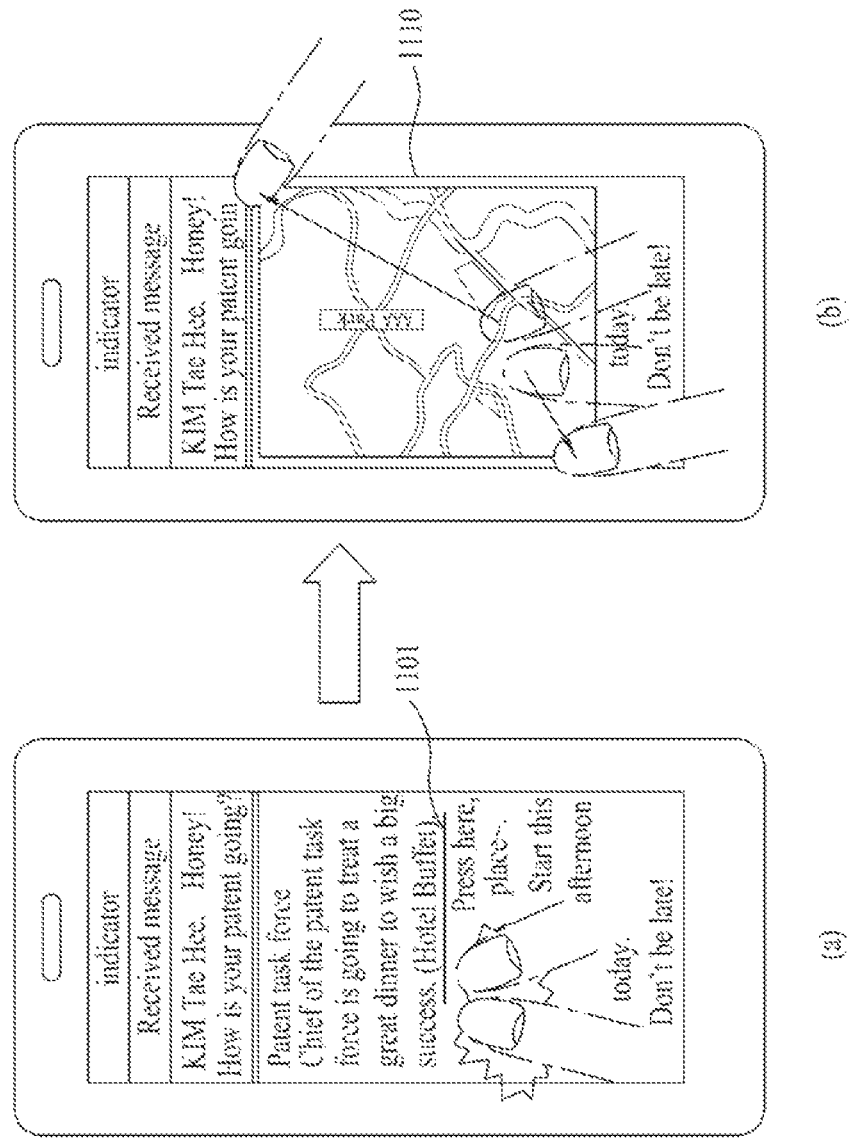

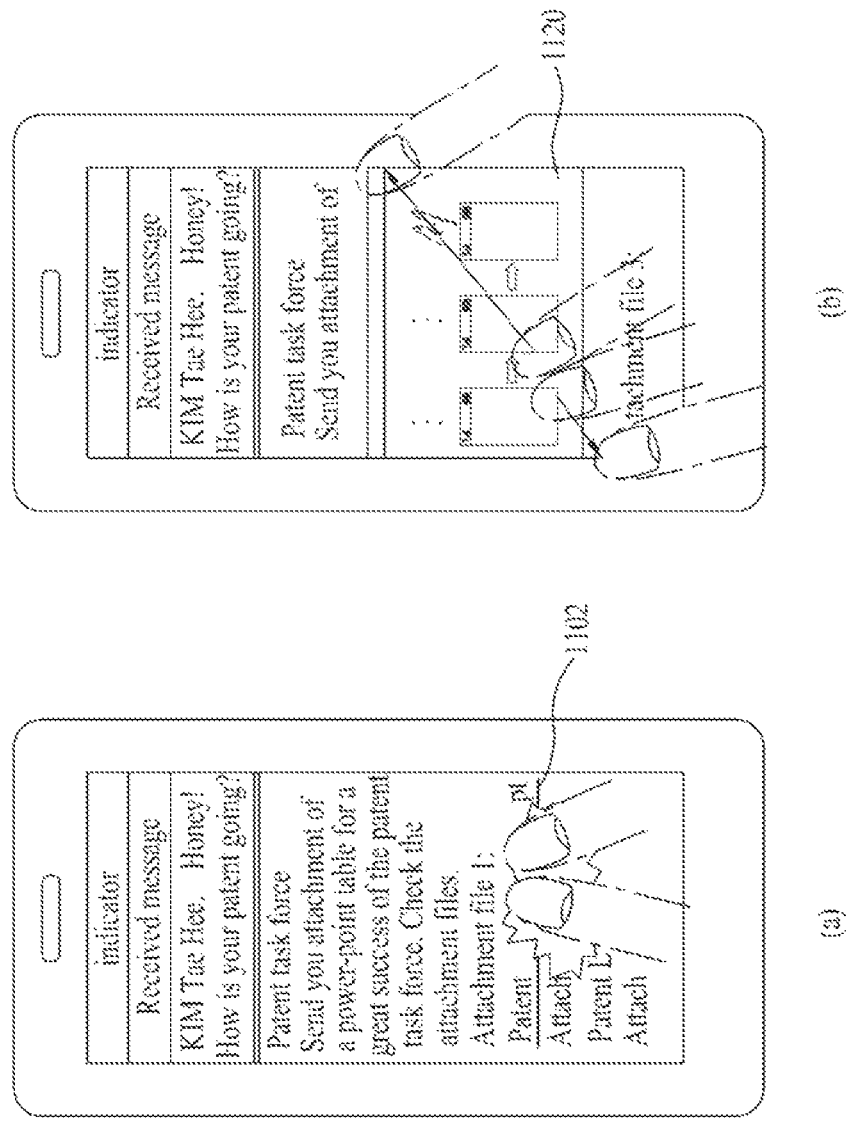

FIG. 12A
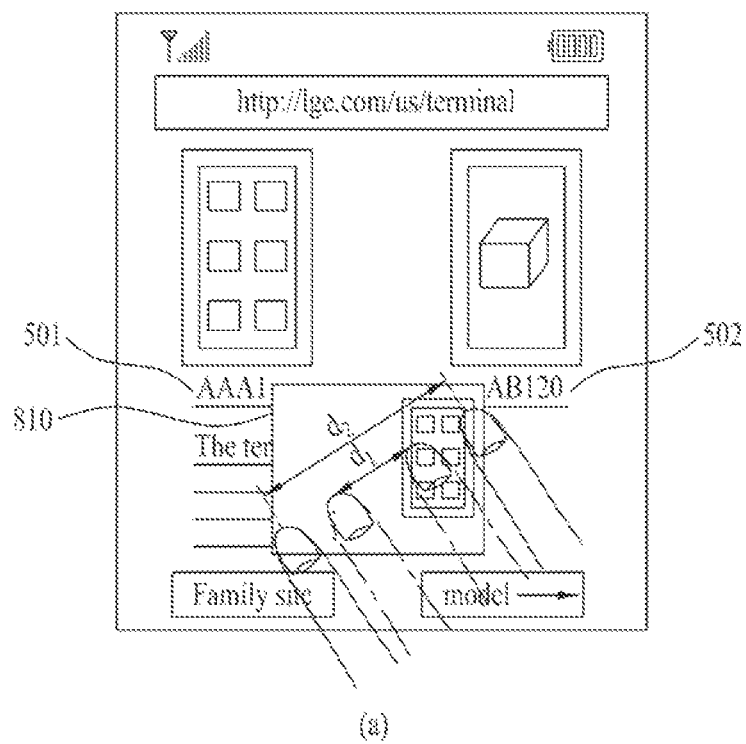
(a)
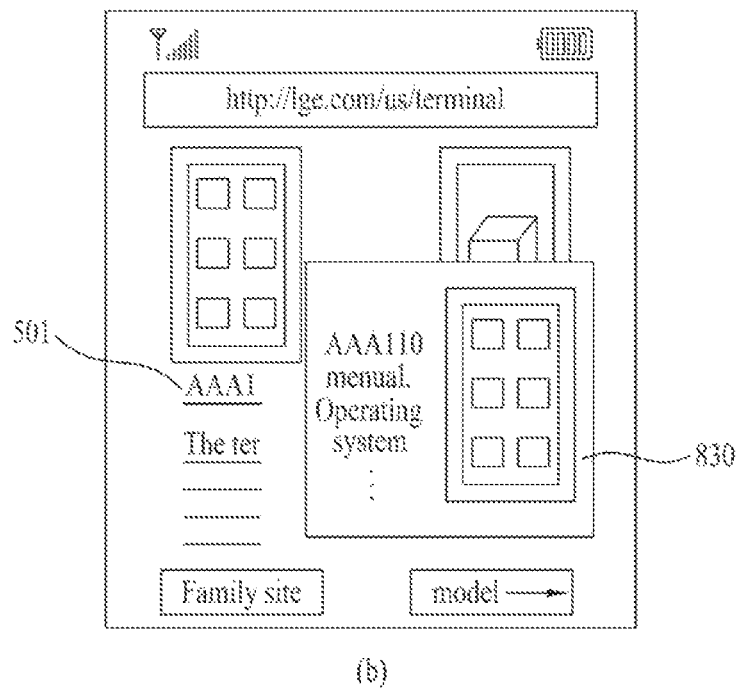
(b)

FIG. 12B
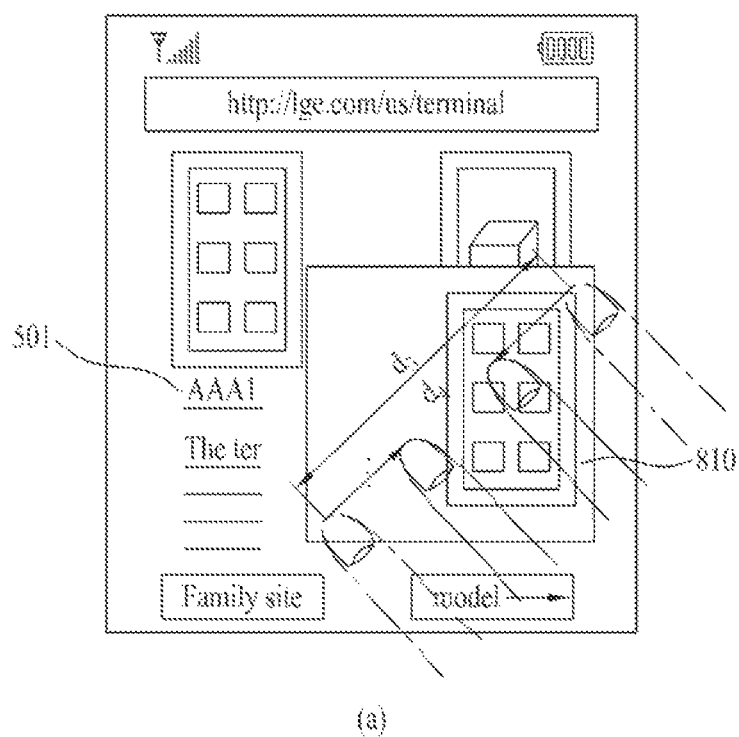
(a)
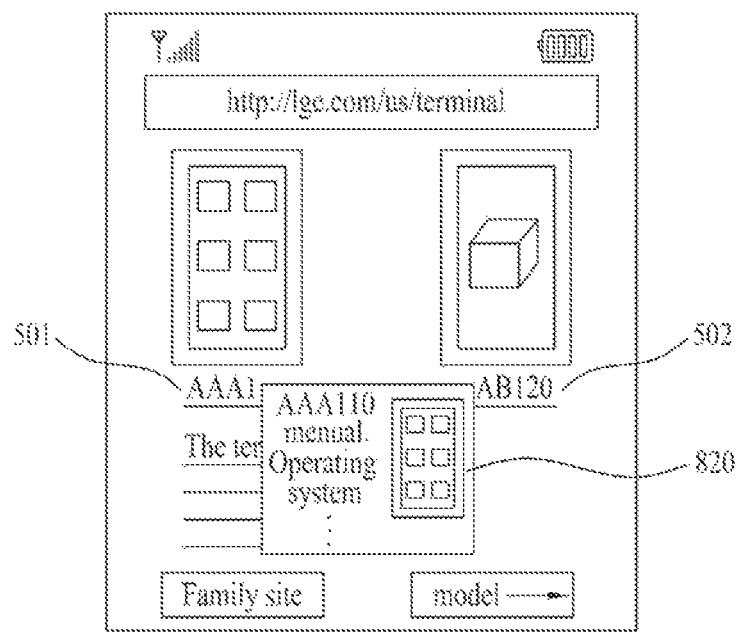
(b)

FIG. 12C
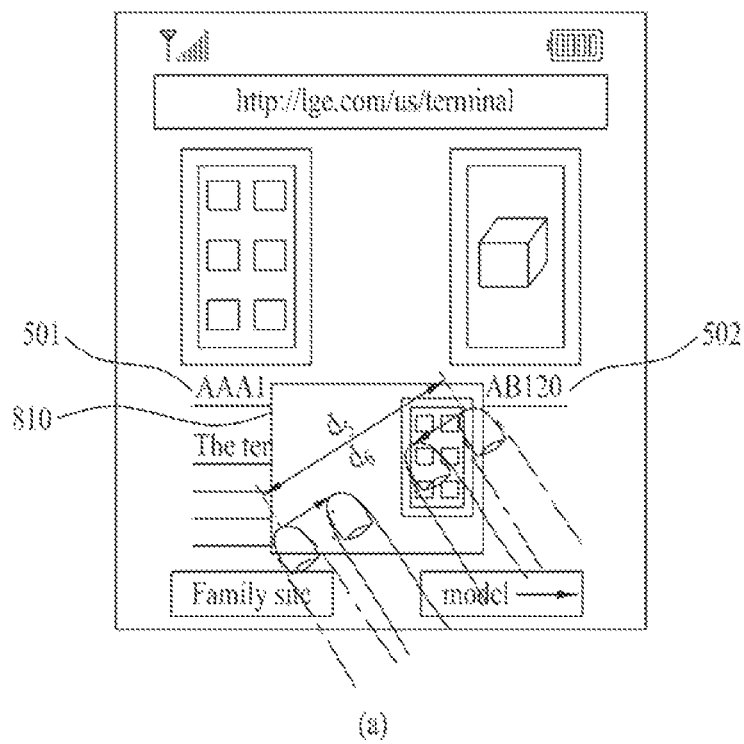
(a)
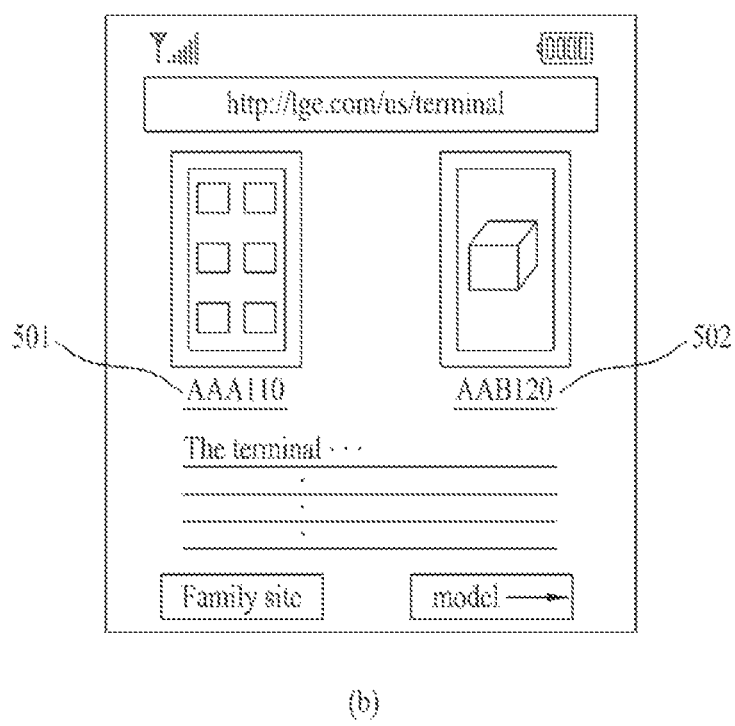
(b)

FIG. 16A
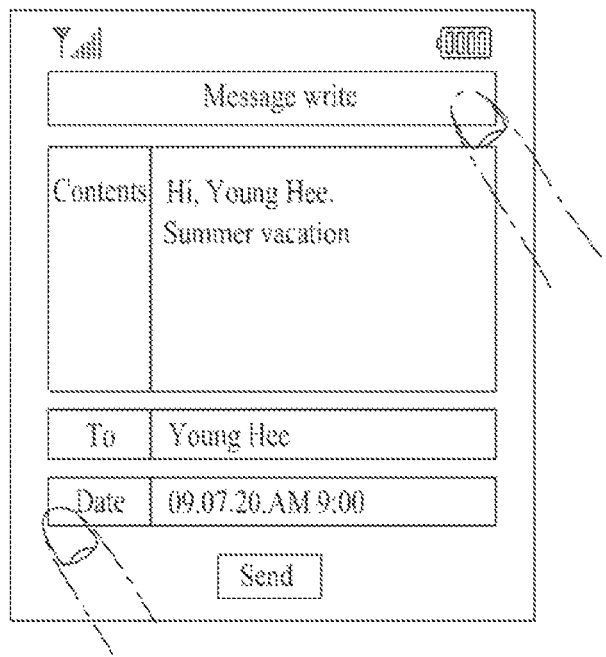
(a)
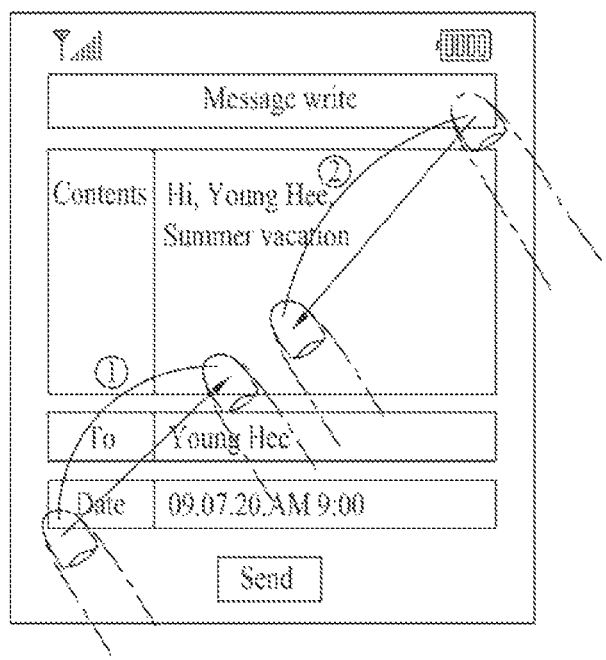
(b)

FIG. 17A
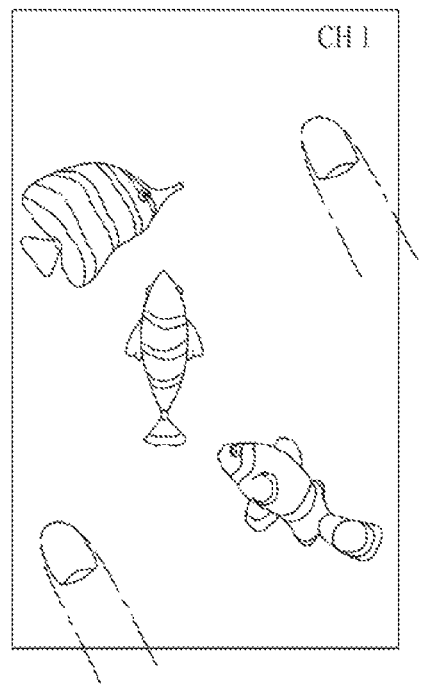
(a)
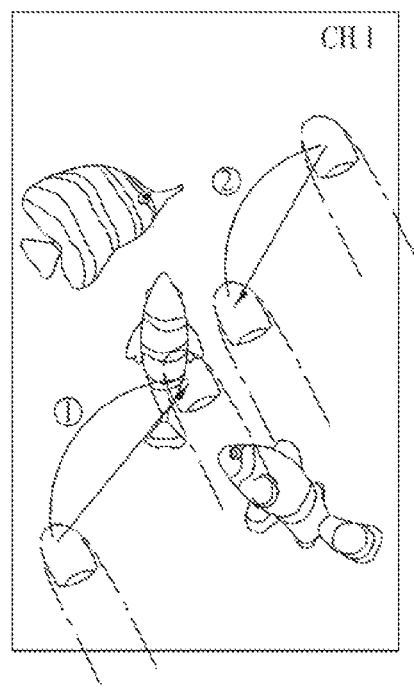
(b)

FIG. 18A
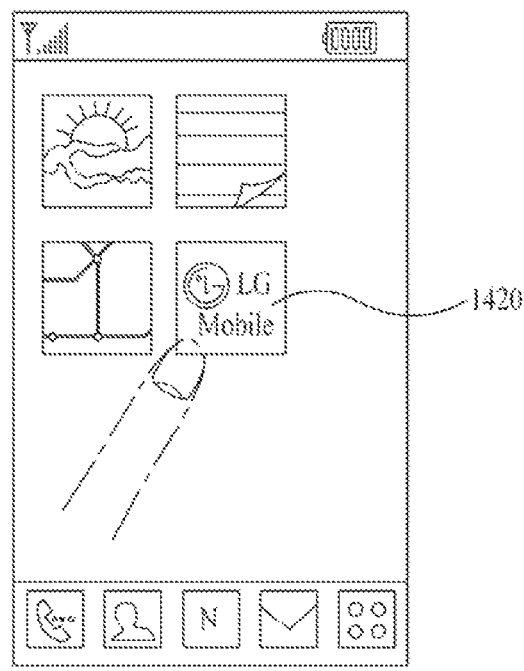
(a)
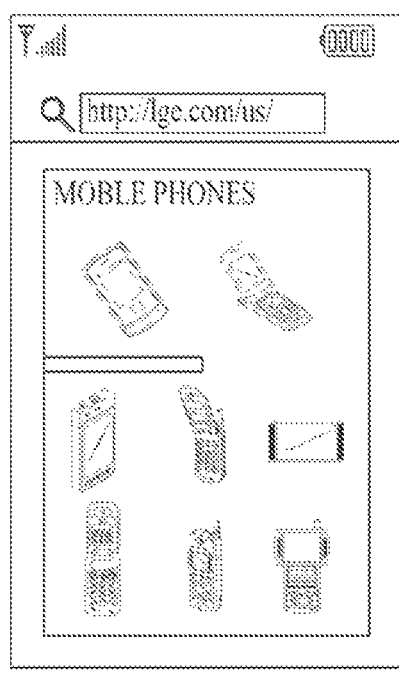
(b)

FIG. 18B
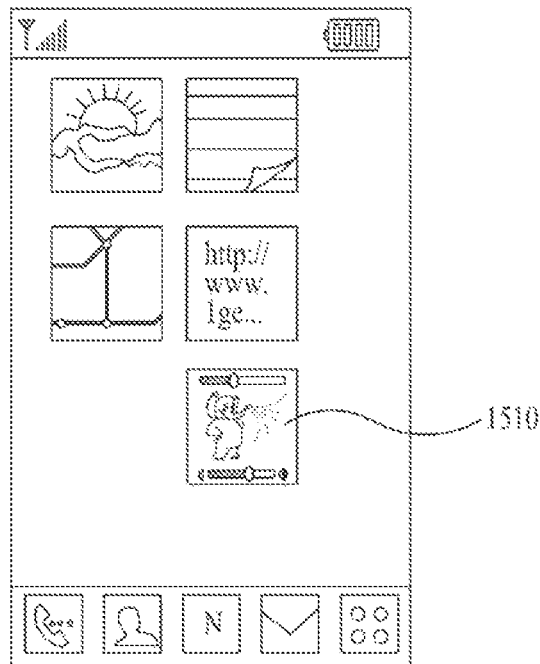
(a)
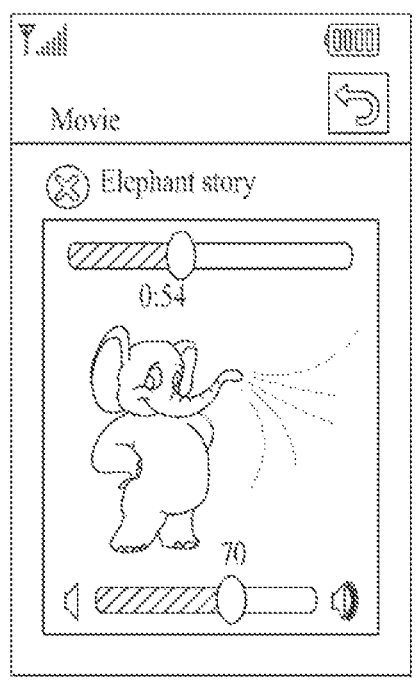
(b)

FIG. 18C
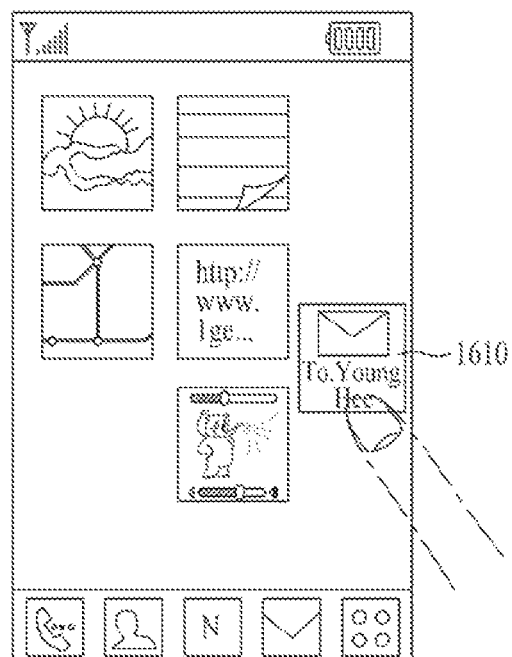
(a)
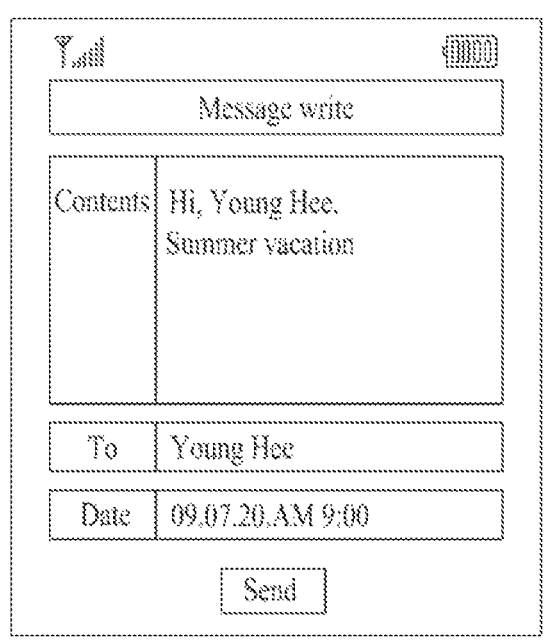
(b)

FIG. 18D
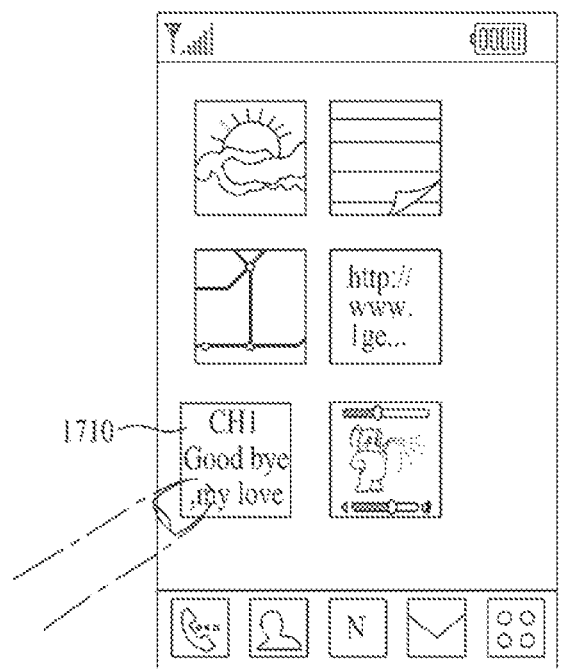
(a)
(b)

MOBILE TERMINAL AND DISPLAY CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2009-0084850, filed on Sep. 9, 2009, the contents of which are hereby incorporated by reference herein in their entirety.

BACKGROUND OF THE INVENTION

Field of the Invention

The present invention relates to a mobile terminal, specifically, to a mobile terminal and display controlling method thereof.

Discussion of the Related Art

Generally, terminals can be classified between mobile terminals and stationary terminals. The mobile terminals can be further classified as handheld terminals and vehicle mounted terminals.

The terminal may be implemented as a multimedia player including options such as the ability to capture still or moving pictures, output music or moving picture files, play games, and receive broadcast signals.

An improvement in the structure or software of the terminal may provide an increase in the functional options provided to the terminal.

For example, if link information is selected in a webpage display mode, a mobile terminal according to a related art may display a webpage corresponding to the selected link information by changing an image. Additionally, if a specific menu item is selected in a menu item list display mode, a mobile terminal according to a related art may display an image corresponding to the selected specific menu item by modifying the image displayed on the screen.

However, according to the related art, the mobile terminal may consume considerable time to display a previously displayed image and may not provide a function to adjust a size of a new image. Here, the term image refers to the characters, images, and text output in a window, or region of a display.

Moreover, according to the related art, a frequently used functionality operation may not be easily bookmarked. Thus, if a current operation of a mobile terminal is temporarily stopped, a corresponding operation must be completely stopped and re-executed in order to resume functionality.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a mobile terminal is presented. The mobile terminal includes a touchscreen configured to display at least one or more data link items, the touchscreen receiving an input for a preview of a first data link item from the at least one or more data link items, and a controller configured to control the touchscreen to display a first display window for displaying a first data associated with the first data link item on a predetermined region of the touchscreen after receiving the input for the preview of the first data link item, and further configured to adjust a size for the first display window after receiving an input associated with a size adjusting signal.

According to one feature, each of the at least one or more data link items includes at least one of web link information, data file identification information, or menu item identification information. Additionally, the mobile terminal also includes a wireless communication unit for accessing a website corresponding to the web link information, wherein the touchscreen displays the accessed website as the first data in the first display window under the control of the controller. Furthermore, if the first data link item comprises the data file identification information the controller executes a data file associated with the data file identification information, and the touchscreen displays an executed image of the executed data file as the first data in the first display window under the control of the controller.

According to another feature, if the first data link item comprises the menu item identification information the controller executes a menu item corresponding to the menu identification information, and the touchscreen displays an executed image of the executed menu item as the first data in the first display window under the control of the controller.

According to yet another feature, the touchscreen receives a simultaneous touch and drag input via a first pointer and a second pointer, such that a distance between the first and second pointers is modified, and the size adjusting signal comprises a size reducing signal associated with a decreasing distance between the first pointer and the second pointer or a size enlarging signal associated with an increasing distance between the first pointer and the second pointer.

According to still yet another feature, the touchscreen receives a simultaneous touch and drag input via a first pointer and a second pointer, such that the a simultaneous touch and drag input decreases a distance between the first and second pointers equal to or less than a predetermined distance, and the controller stops displaying the first display window in response to the simultaneous touch and drag input.

In accordance with another embodiment, a mobile terminal is presented. The mobile terminal includes a touchscreen for displaying an image associated with an executed function, the touchscreen receiving an input for an execution stop command associated with the executed function, a memory; and a controller for stopping the executed function and the display of the image in response to the execution stop command d, for storing re-execution information on the execution stopped functionality operation in the memory, and for controlling the touchscreen to display a re-execution indicator associated with the stopped executed function on a prescribed region of an image.

In accordance with yet another embodiment, a method of controlling a display in a mobile terminal is presented. The method includes displaying an image comprising at least one or more data link items, receiving an input of a preview command for a first data link item among the at least one or more data link items, displaying a first display window for displaying a first data associated with the first data link item on a prescribed region of the displayed image after receiving the preview command input, and receiving a size adjusting input for the displayed first display window, wherein a size of the first display window is adjusted according to the size adjusting input.

In accordance with still yet another embodiment, a method of controlling a display in a mobile terminal is presented. The method includes displaying an image associated with an executed function on a display unit, receiving an execution stop input for the executed function, stopping the execution of the function and the display of the image associated with the executed function and storing re-execution information associated with the stopped executed function, and displaying an re-execution indicator for the stopped execution function on a pre-determined region of the display unit.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 8 illustrates a screen configuration of displaying a webpage on a display window if a preview command signal for web link information is inputted according one embodiment of to the present invention.

FIGS. 9A to 9C are diagrams for screen configurations of displaying a data file execution image on a display window if a preview command signal for file identification information is inputted according to one embodiment of the present invention.

FIG. 10A and FIG. 10B are diagrams for screen configurations of displaying a menu item execution image on a display window if a preview command signal for menu item identification information is inputted according to one embodiment of the present invention.

FIG. 11A and FIG. 11B are diagrams for screen configurations of displaying a data image on a display window if a preview command signal for a data link item included in a received message is inputted according to one embodiment of the present invention.

FIGS. 12A to 12C are diagrams for screen configurations of controlling a display window display according to a size adjusting signal for a display window according to one embodiment of the present invention.

FIG. 16A and FIG. 16B are diagrams for screen configurations of displaying a re-execution indicator if an execution step command signal for a message write operation is inputted according to one embodiment of the present invention.

FIG. 17A and FIG. 17B are diagrams for screen configurations of displaying a re-execution indicator if an execution step command signal for a broadcast signal output operation is inputted according to one embodiment of the present invention.

FIGS. 18A to 18D are diagrams for screen configurations of re-executing an execution stopped functionality operation if a re-execution command signal is inputted according to one embodiment of the present invention.

DETAILED DESCRIPTION OF THE INVENTION

Various embodiments will be described in conjunction with a mobile terminal. However, such teachings apply also to other types of electronic devices. Examples of such devices include a portable device, a digital broadcast receiving terminal, an MP3 player, a personal digital assistant (PDA), and a portable multimedia player (PMP).

Moreover, various methods will be described in conjunction with regard to a mobile terminal. However, it is to be understood that embodiments of the present invention are not so limited and may alternatively be implemented using other types of electronic devices, such as those noted above.

In the following detailed description, reference is made to the accompanying figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
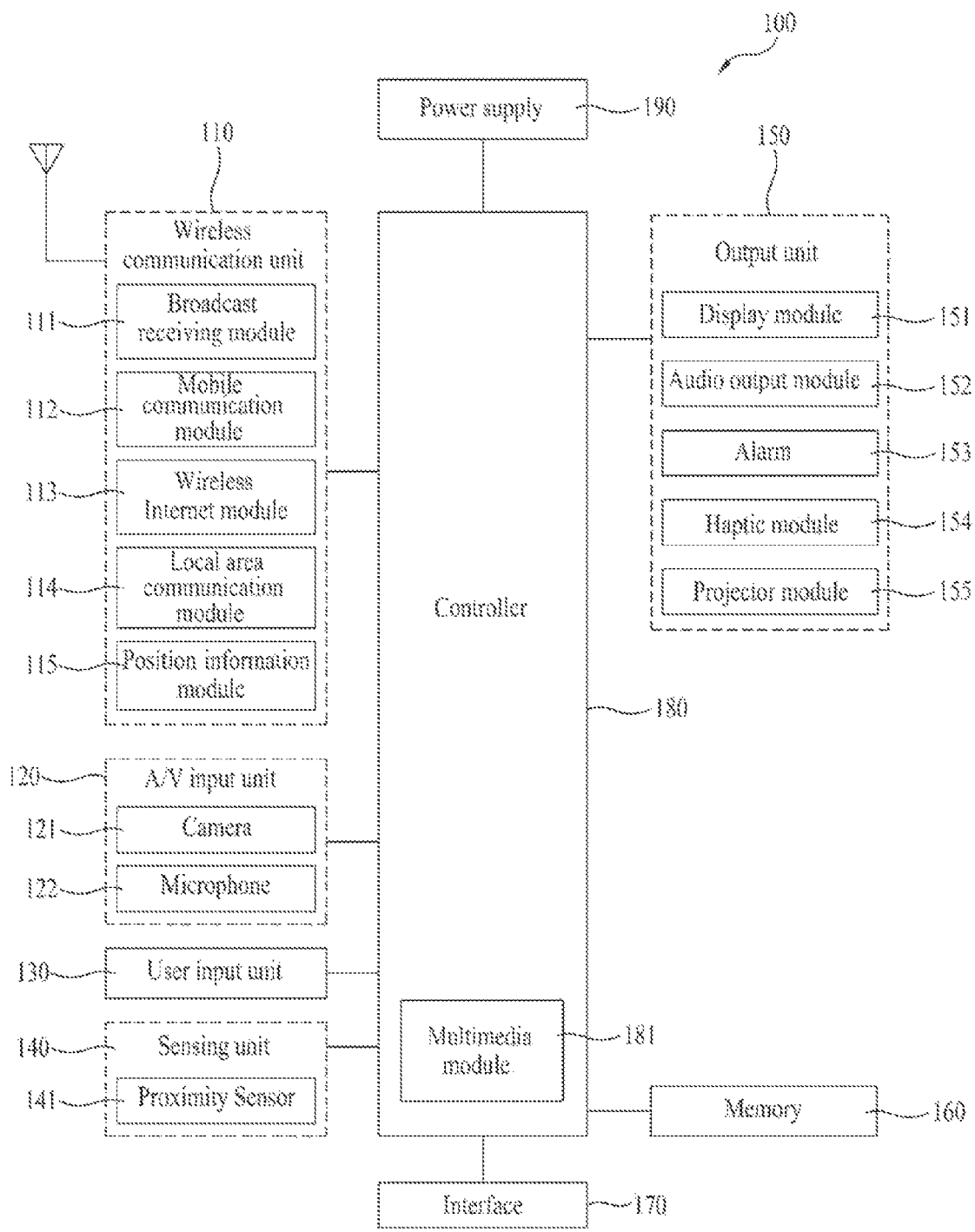
FIG. 1 illustrates a block diagram of a mobile terminal according to one embodiment of the present invention.

FIG. 1 is a block diagram of a mobile terminal 100 according to an embodiment of the present invention. For example, the mobile terminal 100 includes a wireless communication unit 110, an audio/video (A/V) input unit 120, a user input unit 130, a sensing unit 140, an output unit 150, a memory 160, an interface 170, a controller 180, and a power supply 190.

The wireless communication unit 110 includes at least one module that enables radio communication between the mobile terminal 100 and a radio communication system or between the mobile terminal 100 and a network in which the mobile terminal 100 is located. For example, the wireless communication unit 110 may include a broadcast receiving module 111, a mobile communication module 112, a wireless Internet module 113, a local area communication module 114, and a position information module 115.

The broadcast receiving module 111 may receive broadcast signals and broadcast related information from an external broadcast management server through a broadcast channel. The broadcast channel may include a satellite channel and a terrestrial channel. The broadcast management server can be a server that generates and transmits broadcast signals and broadcast related information or a server that receives previously created broadcast signals and broadcast related information. The server may transmit the broadcast signals and broadcast related information to a terminal.

Further, the broadcast signals can include not only TV broadcast signals, radio broadcast signals and data broadcast signals, but also signals in the form of a combination of a TV broadcast signal and a radio broadcast signal. In addition, the broadcast related information can be information on a broadcast channel, a broadcast program or a broadcast service provider. Moreover, the broadcast related information can be provided even through a mobile communication network such that the broadcast related information can be received by the mobile communication module 112.

The broadcast related information may exist in various forms. For example, the broadcast related information can exist in the form of an electronic program guide (EPG) of the digital multimedia broadcasting (DMB) system or in the form of an electronic service guide (ESG) of the digital video broadcast-handheld (DVB-H) system.

In addition, the broadcast receiving module 111 receives broadcast signals using various broadcasting systems. Particularly, the broadcast receiving module 111 can receive digital broadcast signals using digital broadcasting systems such as the digital multimedia broadcasting-terrestrial (DMB-T) system, the digital multimedia broadcasting-satellite (DMB-S) system, the media forward link only (MediaFLO) system, and the DVB-H and integrated services digital broadcast-terrestrial (ISDB-T) systems. The broadcast receiving module 111 can also be constructed to be suited to broadcasting systems providing broadcast signals other than the above-described digital broadcasting systems.

Further, the broadcast signals and/or broadcast related information received through the broadcast receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and reception of text/multimedia messages.

The wireless Internet module 113 corresponds to a module for wireless Internet access and can be included in the mobile terminal 100 or externally attached to the mobile terminal 100. A wireless LAN (WLAN) (Wi-Fi), wireless broadband (Wibro), world interoperability for microwave access (Wimax), or high speed downlink packet access (HSDPA) can be used as a wireless Internet technique.

The local area communication module 114 corresponds to a module for local area communication. For example, BLUETOOTH®, radio frequency identification (RFID), infrared data association (IrDA), ultra wideband (UWB) or ZigBee® can be used as a local area communication technique.

The position information module 115 confirms or obtains the position of the mobile terminal 100. In more detail, a global positioning system (GPS) module is a representative example of the position information module 115. In addition, the GPS module 115 can calculate information on distances between one point or object and at least three satellites and information on the time when the distance information is measured and apply trigonometry to the obtained distance information to obtain three-dimensional position information on the point or object according to the latitude, longitude and altitude at a predetermined time.

Furthermore, a method of calculating position and time information using three satellites and correcting the calculated position and time information using another satellite can also be used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. Further, the processed image frames can be displayed on a display module 151.

The image frames processed by the camera 121 can be stored in the memory 160 or transmitted to an external device through the radio communication unit 110. The mobile terminal 100 can also include at least two cameras 121. The microphone 122 receives an external audio signal in a call mode, a recording mode or a speed recognition mode and processes the received audio signal into electric audio data.

The audio data can then be converted into a form that can be transmitted to a mobile communication base station through the mobile communication module 112 and output in the call mode. Further, the microphone 122 can employ various noise removal algorithms for removing noise generated when the external audio signal is received.

In addition, the user input unit 130 receives input data for controlling the operation of the mobile terminal 100 from a user. The user input unit 130 may include a keypad, a dome switch, a touch pad (constant voltage/capacitance), jog wheel, or jog switch.

The sensing unit 140 senses the current state of the mobile terminal 100, such as an open/close state of the mobile terminal 100, the position of the mobile terminal 100, whether a user touches the mobile terminal 100, the direction of the mobile terminal 100 and the acceleration/deceleration of the mobile terminal 100, and generates a sensing signal for controlling the operation of the mobile terminal 100. For example, the sensing unit 140 can sense whether a slide phone is opened or closed when the mobile terminal 100 is a slide phone. Furthermore, the sensing unit 140 can sense whether the power supply 190 supplies power and whether the interface 170 is connected to an external device. The sensing unit 140 can also include a proximity sensor 141.

Referring to FIG. 1, the proximity sensor 141 of the sensing unit 140 may be located in an internal region of the mobile terminal 100, surrounded by the touch screen, or near the touch screen. The proximity sensor 141 senses an object approaching a predetermined sensing face or an object located near the proximity sensor 141 using an electromagnetic force or infrared rays without having mechanical contact. Further, the proximity sensor 141 may have a lifetime longer than that of a contact sensor, and thus, has a wide application in the mobile terminal 100.

Furthermore, the proximity sensor 141 includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, or an infrared proximity sensor. Further, a capacitive touch screen is constructed such that proximity of a pointer is detected through a variation in an electric field according to the proximity of the pointer. In this instance, the touch screen or touch sensor can be classified as a proximity sensor 141.

For convenience of explanation, the action of the pointer approaching the touch screen without actually touching the touch screen is referred to as "proximity touch" and an action of bringing the pointer into contact with the touch screen is referred to as "contact touch" in the following description. In addition, the proximity touch point of the pointer on the touch screen corresponds to a point of the touch screen to which the pointer vertically opposes but does not make contact when performing the proximity touch.

Further, the proximity sensor 141 senses the proximity touch and a proximity touch pattern, such as a proximity touch distance, a proximity touch direction, a proximity touch velocity, a proximity touch time, a proximity touch position, or a proximity touch moving state. Information corresponding to the sensed proximity touch action and proximity touch pattern can then be displayed on the touch screen.

In addition, the output unit 150 generates visual, auditory or tactile output and includes, for example, the display module 151, an audio output module 152, an alarm 153, a haptic module 154, and a projector module 155. The display module 151 displays information processed by the mobile terminal 100.

For example, the display module 151 displays a user interface (UI) or graphic user interface (GUI) related to a telephone call when the mobile terminal 100 is in the call mode. The display module 151 also displays a captured or/and received image, UI or GUI when the mobile terminal 100 is in the video telephony mode or the photographing mode.

In addition, the display unit 151 may include at least a liquid crystal display, a thin film transistor liquid crystal display, an organic light-emitting diode display, a flexible display or a three-dimensional display. Further, some of these displays can be of a transparent type or a light transmission type. That is, the display module 151 can include a transparent display.

In more detail, the transparent display includes a transparent liquid crystal display. Further, the rear structure of the display module 151 can also be of the light transmission type. Accordingly, a user can see an object located behind the body of the mobile terminal 100 through the transparent area of the body of the mobile terminal 100, which is occupied by the display module 151.

The mobile terminal 100 may have at least two display modules 151. For example, the mobile terminal 100 may include a plurality of displays that are arranged on a single face at a predetermined distance or integrated displays. The plurality of displays can also be arranged on different sides.

In addition, when the display module 151 and a touch sensor that senses touch form a layered structure or a touch screen, the display module 151 can be used as an input device as well as an output device. The touch sensor can be in the form of a touch film, a touch sheet and a touch pad, for example.

Further, the touch sensor can be constructed to convert a variation in pressure applied to a specific portion of the display module 151 or a variation in capacitance generated at a specific portion of the display module 151 into an electric input signal. The touch sensor can also be constructed to sense pressure of touch as well as the position and area of the touch.

When the user applies touch input to the touch sensor, a signal corresponding to the touch input is transmitted to a touch controller (not shown). The touch controller then processes the signal and transmits data corresponding to the processed signal to the controller 180. Accordingly, the controller 180 can detect a touched portion of the display module 151.

The audio output module 152 can output audio data received from the radio communication unit 110 or stored in the memory 160 in a call signal receiving mode, a telephone call mode or a recording mode, a speech recognition mode and a broadcasting receiving mode. Further, the audio output module 152 outputs audio signals related to functions performed in the mobile terminal 100, such as a call signal incoming tone and a message incoming tone. The audio output module 152 may include a receiver, a speaker, and a buzzer.

The alarm 153 outputs a signal for indicating the generation of an event of the mobile terminal 100. For example, a signal can be generated by the alarm 153 when receiving a call signal, receiving a message, receiving a key signal, or receiving touch input. The alarm 153 can also output signals in forms different from video signals or audio signals, such as a signal for indicating generation of an event through vibration. The video signals or the audio signals can be also output through the display module 151 or the audio output module 152.

The haptic module 154 generates various haptic effects that the user can feel. One representative example of the haptic effects is vibration. The intensity and pattern of vibration generated by the haptic module 154 can also be controlled. For example, different vibrations can be combined and output or can be sequentially output.

Other haptic effects include an effect of stimulus according to an arrangement of pins vertically moving against a contacted skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 can transmit not only haptic effects through direct contact but also allow the user to feel haptic effects through a kinesthetic sense of the user's fingers or arms. The mobile terminal 100 may include multiple haptic modules 154.

The projector module 155 may perform an image projector function via the mobile terminal 100. For example, the projector module 155 may display an image, which is identical to or similar to the image displayed on the display unit 151.

Specifically, the projector module 155 may include a light source (not shown) for generating light, such as a laser, for projecting an image, an image producing means (not shown) for outputting an image via the light source, and a lens (not shown) for enlarging or focusing the image output. Additionally, the projector module 155 may also include a directional device (not shown) for adjusting a direction in which an image is projected by mechanically moving the lens or the whole module.

The projector module 155 may be classified as a CRT (cathode ray tube) module, an LCD (liquid crystal display)

module, or a DLP (digital light processing) module according to a type of display. The projector module 155 may be provided on any portion of the mobile terminal 100 according to the necessity thereof.

The memory 160 can store a program for the operation of the controller 180 and temporarily store input/output data, such as a phone book, messages, still images, and moving images. The memory 160 can also store data related to vibrations and sounds in various patterns, which are output when a touch input is applied to the touch screen.

Further, the memory 160 can include a flash memory, a hard disk type memory, a multimedia card micro type memory, a random access memory (RAM), a static RAM (SRAM), a read-only memory (ROM), an electrically erasable programmable ROM (EEPROM), a programmable ROM (PROM) magnetic memory, a magnetic disk, an optical disk, or a card type memory such as SD or XD memory. The mobile terminal 100 can also operate in relation to a web storage operation performing the storing function of the memory 160 via the Internet.

The interface 170 serves as a path to external devices connected to the mobile terminal 100. Further, the interface 170 receives data from the external devices or power and transmits the data or power to the internal components of the mobile terminal 100 or transmits data of the mobile terminal 100 to the external devices. Also, the interface 170 can include a wired/wireless headset port, an external charger port, a wired/wireless data port, a memory card port, a port for connecting a device having a user identification module, an audio I/O port, a video I/O port, or an earphone port, for example.

The interface 170 can also interface with a user identification module that is a chip that stores information for authenticating the authority to use the mobile terminal 100. For example, the user identification module includes a user identify module (UIM), a subscriber identify module (SIM) or a universal subscriber identify module (USIM).

An identification device including the user identification module can also be manufactured in the form of a smart card. Accordingly, the identification device may be connected to the mobile terminal 100 through a port of the interface 170.

The interface 170 can also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle can be used as signals for confirming whether the mobile terminal 100 is correctly set in the cradle.

The controller 180 controls the overall operations of the mobile terminal 100. For example, the controller 180 performs control and processing for voice communication, data communication and video telephony. As shown in FIG. 1, the controller 180 also includes a multimedia module 181 for playing multimedia. The multimedia module 181 may be included in the controller 180 as shown in FIG. 1 or can be separated from the controller 180.

Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal 100 under the control of the controller 180.

According to hardware implementation, the embodiments of the present invention can be implemented using application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electrical units for executing functions. In some cases, the embodiments of the present invention may be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Various embodiments of the present invention will be explained. In the specification, a touch signal or a touch operation may include both a contact touch and a proximity touch. Further, the touch signal or the touch operation may include a point touch or a stroke including a flicking operation and a dragging operation.

Figure 2A:
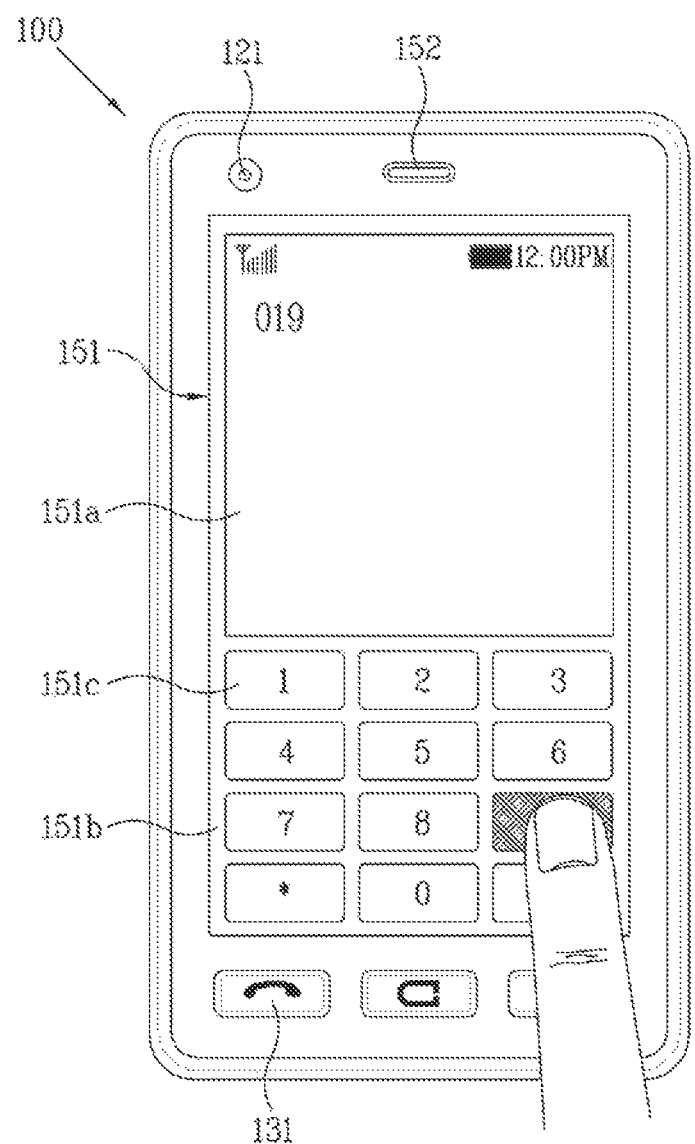
FIG. 2A and FIG. 2B illustrate front diagrams of a mobile terminal according to one embodiment of the present invention for explaining an operational status of the mobile terminal, respectively.
Figure 2B:
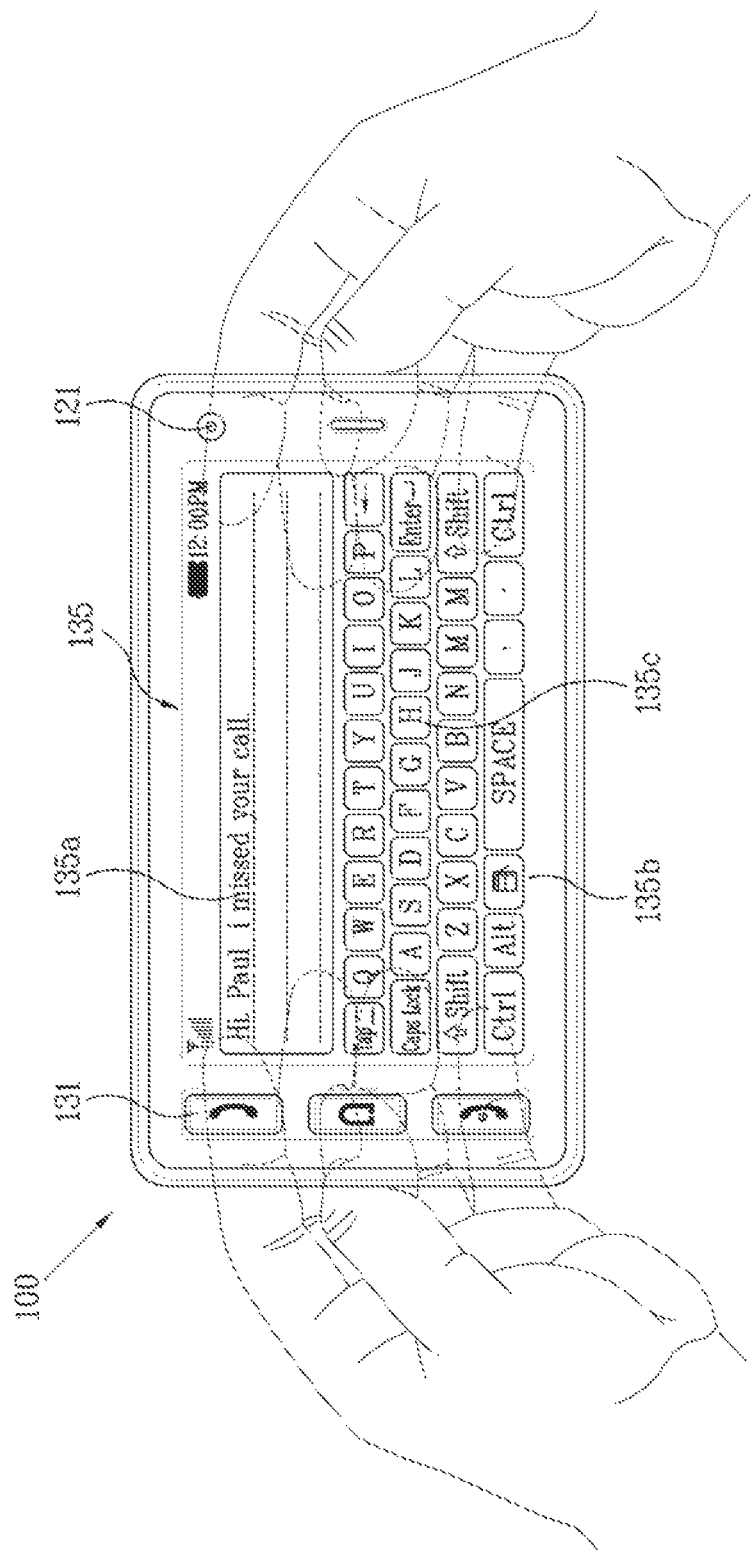

FIG. 2A and FIG. 2B illustrate front-view diagrams of a terminal according to one embodiment of the present invention.

Various types of visual information may be displayed on the display unit 151. The information may comprise characters, numerals, symbols, graphics, or icons. In order to input the information, at least one of the characters, numerals, symbols, graphics and icons are represented as a single key in a keypad formation, the keypad formation may be referred to as "soft keys".

FIG. 2A illustrates that a touch applied to a soft key is input via a front face of a terminal body.

The display module 151 can be a single area or can be divided into a plurality of regions. In the latter instance, the display unit 151 is constructed such that the plurality of regions interoperate with each other.

For example, and as shown in FIG. 2A, an output region 151a and an input region 151b are respectively displayed in upper and lower parts of the display module 151. The input region 151b displays soft keys 151c that represent numerals used to input numbers such as telephone numbers. Thus, when a soft key 151c is touched, a numeral corresponding to the touched soft key is displayed on the output region 151a. Further, when the user operates the first operating unit 116, a connection of a call corresponding to a telephone number displayed on the output region 151a is attempted.

FIG. 2B is an overview of the mobile terminal 100 showing that touch applied to soft keys is input via a rear side of the terminal body. FIG. 2B also shows a landscape view of the terminal body while FIG. 2A shows a portrait view of the terminal body. In addition, the display unit 151 is constructed such that an output image is converted according to the direction in which the terminal body is located.

Further, FIG. 2B shows the operation of the handheld terminal in a text input mode. As shown, the display unit 151 includes a touch pad display 135 having an output region 135a and an input region 135b. A plurality of soft keys 135c indicating at least one of characters, symbols and numerals are also arranged in the input region 135b. Further, in this embodiment, the soft keys 135c are arranged in the form of QWERTY keys.

Thus, when the soft keys 135c are touched through the touch pad 135, the characters, numerals and symbols corresponding to the touched soft keys 135c are displayed on the output region 135a. Touch input through the touch pad 135 can prevent the soft keys 135c from being covered with user's fingers when the soft keys 135c are touched as compared to touch input through the display unit 151. Further, when the display unit 151 and the touch pad 135 are transparent, the user can see his or her fingers located behind the terminal body, and thus can select items by touching the backside or surface of the displayed keys 135c.

In addition, the user can scroll the display unit 151 or the touch pad 135 to move an object displayed on the display unit 151, for example, by using a cursor or a pointer located on an icon. Also, when the user moves his or her finger on the display unit 151 or the touch pad 135, the controller 180 can visually display the user's finger moving path on the display unit 151. This is useful to edit an image displayed on the display unit 151.

Also, when the display unit 151 (touch screen) and the touch pad 135 are simultaneously touched within a predetermined period of time, a specific function of the terminal can be executed. For example, the user can clamp the terminal body using his thumb and index finger. This specific function can include activating or deactivating the display unit 151 or the touch pad 135, for example.

Embodiments of the present invention will now be explained. It is assumed that the display unit 151 corresponds to a touch screen for convenience of explanation. As described above, the touch screen 151 can perform both the function of displaying information and the function of inputting information. However, the present invention is not limited thereto. Further, touch may include contact touch and proximity touch. The proximity touch will be explained in detail with reference to FIG. 3.

Figure 3:
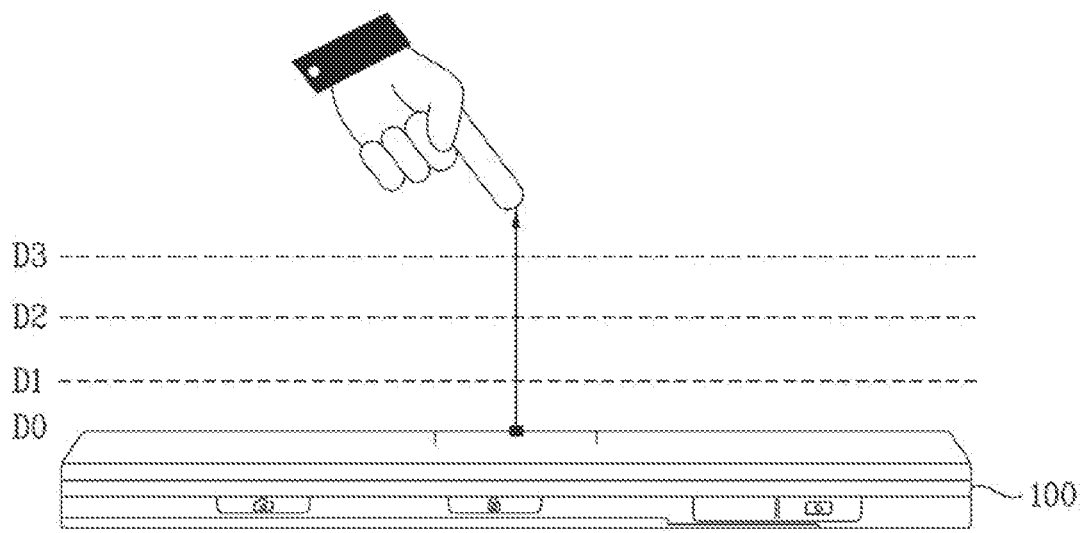
FIG. 3 is a diagram illustrating a for proximity depth of a proximity sensor.

FIG. 3 is a diagram illustrating a proximity depth of a proximity sensor.

As shown in FIG. 3, when a pointer such as a user's finger approaches the touch screen, the proximity sensor located inside or near the touch screen senses the approach and outputs a proximity signal. Further, the proximity sensor can be constructed such that it outputs a proximity signal according to the distance between the pointer approaching the touch screen and the touch screen (referred to as "proximity depth").

Also, the distance in which the proximity signal is output when the pointer approaches the touch screen is referred to as a detection distance. The proximity depth can be determined using a plurality of proximity sensors having different detection distances and comparing proximity signals respectively output from the proximity sensors.

FIG. 3 shows the section of the touch screen in which proximity sensors capable of sensing three proximity depths are arranged. Of course, proximity sensors capable of sensing less than three or more than three proximity depths can be arranged in the touch screen.

Thus, as shown in FIG. 3, when the pointer (user's finger in this example) completely comes into contact with the touch screen (D0), the controller 180 recognizes this action as the contact touch. When the pointer is located within a distance D1 from the touch screen, the controller 180 recognizes this action as a proximity touch of a first proximity depth.

Similarly, when the pointer is located in a range between the distance D1 and a distance D2 from the touch screen, the controller 180 recognizes this action as a proximity touch of a second proximity depth. When the pointer is located in a range between the distance D2 and a distance D3 from the touch screen, the controller 180 recognizes this action as a proximity touch of a third proximity depth. Also, when the pointer is located beyond the distance D3 from the touch screen, the controller 180 recognizes this action as a cancellation of the proximity touch.

Accordingly, the controller 180 can recognize the proximity touch as various input signals according to the proximity distance and proximity position of the pointer with respect to the touch screen and perform various operations according to the input signals.

Assume that a mobile terminal in the following disclosure includes a touchscreen. As mentioned in the foregoing description, the touchscreen is configured in a layered structure comprising a touchpad and the display unit 151 overlapped with each other and can operate as an input and display means.

According to the present invention, the mobile terminal 100 may display data in a display window on a prescribed region of a screen to correspond to a preview command signal input for a specific data link item and may display a re-execution indicator on a prescribed region of the screen to correspond to an execution stop command signal input for a functionality execution image.

In the following description, a first embodiment of the present invention is explained in detail with reference to the accompanying drawings.

Figure 4:
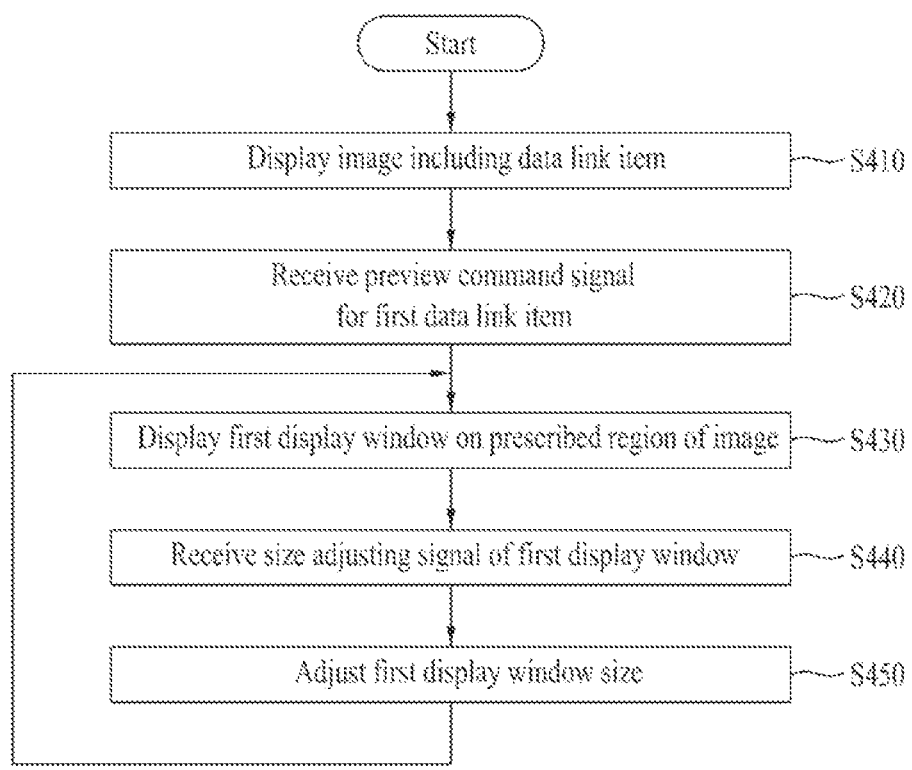
FIG. 4 is a first flowchart for a method of controlling a display in a mobile terminal according to one embodiment of the present invention.

FIG. 4 is a flowchart for a method of controlling a display in a mobile terminal according to an embodiment of the present invention.

As illustrated in FIG. 4, the mobile terminal 100 displays at least one data link item on the touchscreen [S410]. The mobile terminal 100 receives an input of a preview command signal (hereinafter a first preview command signal) for a first data link item selected from the at least one data link displayed in step S410 [S420]. In response to step S420, The mobile terminal 100 displays a first display window for displaying the first data associated with the first data link item on a predetermined region of the information displayed in the displaying step S410 [S430]. The mobile terminal 100 may receive an input for adjusting the first display window displayed on the touchscreen in step S430 [S440]. Subsequently, the mobile terminal 100 may adjust a size of the first display window to correspond to the size adjusting signal input in step S440 [S450].

The data link item may refer to an item for linking specific data. The controller 180 may execute the data associated with the selected data link item when the data link item is selected. The data link item may include items such as a web link, a data file link, or a menu item link.

For example, in step S410, the displayed web link may be included in a received message, a website, a chat using an instant messaging service (IMS), or information shared via a social network service (SNS) such as Twitter. Additionally, in step S410 the data link may be included in a received message, a data file list comprising file identification information, or a chat message including identification information of a data file. Finally, a menu link may be displayed via a menu search.

As discussed above, in step S420, the mobile terminal 100 may receive an input for a first preview command signal for a first data link item selected from the at least one data link displayed in step S410. The preview command signal may comprise a signal for commanding the mobile terminal 100 to display information associated with the first data link item without switching from a current display, such that the information associated with the first data link item may be displayed in a predetermined partial region. Moreover, the preview command signal may be simultaneously or sequentially input for a plurality of the data link items.

The controller 180 may determine that a user input via the touchscreen corresponds to the execution command signal for the first data link item or the preview command signal. Specifically, the controller 180 may determine various touch patterns, such that a specific touch pattern may be associated with the execution command signal and another specific touch pattern may be associated with the preview command signal. Furthermore, the various touch patterns may be pre-stored in the memory 160 during the manufacturing process of the mobile terminal 100.

For example, the touch pattern associated with the execution command signal may include a double touch with reference to the first data link item or a touch and drag in a first direction. Furthermore, the touch action associated with the preview command signal may include a single touch with reference to the first data link item or a touch and drag in a second direction.

Additionally, the preview command signal of step S420 is not limited to an input received via a touchscreen. For example, the preview command signal of step S420 may be input via a key, such as a numeral key or a direction key, or a mouse.

As previously discussed, if a first preview command signal is input in the inputting step S420, the mobile terminal 100 displays a first display window for displaying the information associated with the first data link item on a predetermined region of the information displayed in the step S410 [S430].

For example, if the first data link item is a web link, when a first preview command signal is input, the controller 180 accesses a first website corresponding to the web link via the wireless Internet module 113 and may display the first website on the first display window. In this example, the controller 180 maintains the access to the website which included the first data link item and also displays the first website associated with the first data link item in a predetermined prescribed region of the display 151.

The mobile terminal 100 may receive a size adjusting input for the first display window displayed on the touchscreen in the displaying step S430 [S440]. Subsequently, the mobile terminal 100 may then adjust a size of the first display window to correspond to the size adjusting signal inputted in the inputting step S440 under the control of the controller 180 [S450].

In this example, the size adjusting input may correspond to a touch action on the first display window and may include, for example, a size enlarging signal, a size reducing signal, or a display end signal.

For example, the size enlarging signal, the size reducing signal, and the display end signal may be input if a user performs a pre-determined number of touches, a pre-determined distance and direction touch and drag, or a touch action of a pre-determined pattern.

Moreover, according to the example provided above, the touchscreen may receive a simultaneous touch and drag input which increases a distance between the first and second pointers, which may be associated with a widening action. The controller 180 may recognize the widening action as the size enlarging command, and thereby, transmit the appropriate size enlarging signal.

In this example, a touch count, touch and drag distance, and a touch action, which corresponds to each of the size enlarging command, the size reducing command and the display end command, may be stored in the memory 160.

Figure 5:
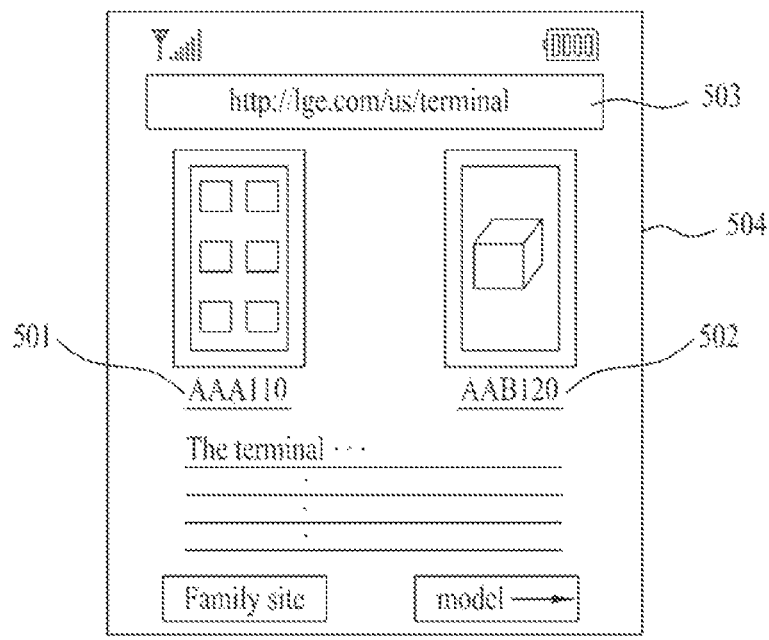
FIG. 5 illustrates a screen configuration for displaying an image including web link information as a data link item according to one embodiment of the present invention.

FIG. 5 illustrates a screen configuration for displaying an image including web link information as a data link item.

Referring to FIG. 5, the mobile terminal 100 may display a webpage 504 associated with a URL 503. In this example, the webpage 504 may include a plurality of web links 501 and 502.

Figure 6A:
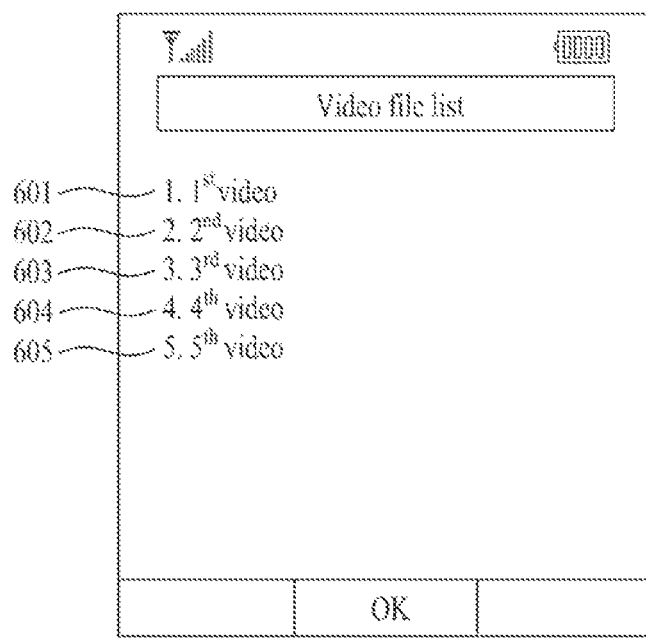
FIGS. 6A to 6C illustrate screen configurations of displaying an image including data file identification information as a data link item according to one embodiment of the present invention.
Figure 6B:
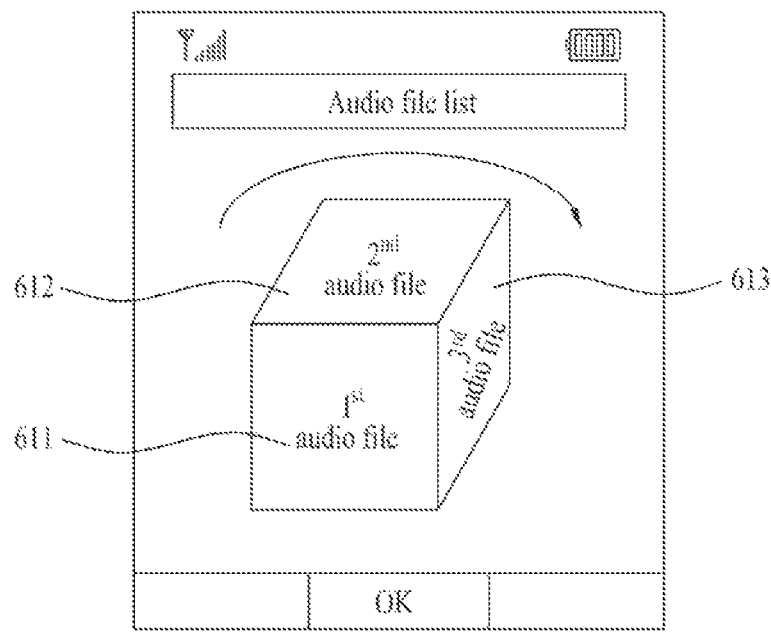
Figure 6C:
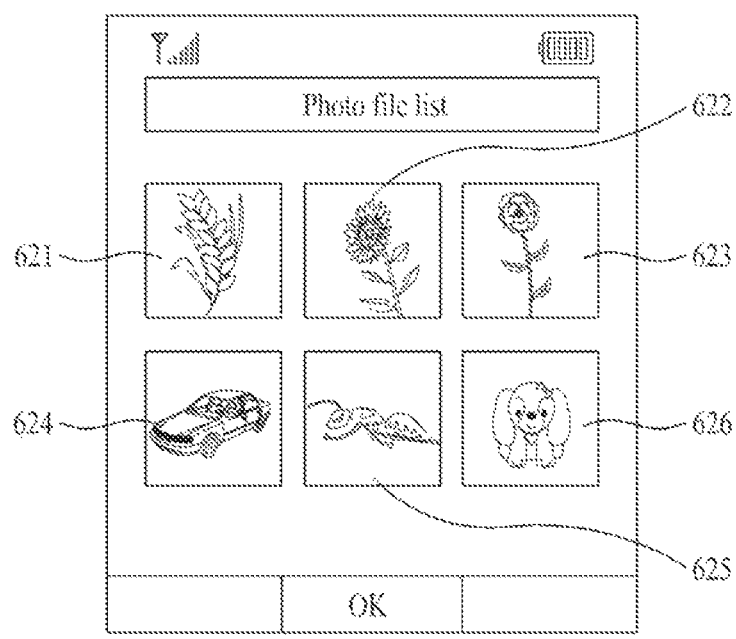

FIGS. 6A to 6C illustrate screen configurations of displaying data file identification information as a data link item.

Referring to FIG. 6A, if a menu item corresponding to a video file list view is selected via a menu search, the mobile terminal 100 may display the video file list comprising a plurality of data links 601-605 associated with video file identification information. Note, the identification information for a data file is not limited to data links associated with video file identification information as illustrated in FIG. 6A and may be associated with other types of information.

As illustrated in FIG. 6B, the mobile terminal 100 may display a 3-dimensional polyhedron if a menu item corresponding to an audio file list view is selected via a menu search. Additionally, the mobile terminal 100 may also display a plurality of data links 611-613 associated with audio files. The plurality of data links 611-613 may be designated to facets of the polyhedron, respectively. In this example, a corresponding audio file may be pre-designated to each of the facets of the polyhedron, and, the polyhedron may be rotated. Note, the data links are not limited to data links associated with audio files as illustrated in FIG. 6B and may be associated with other file types.

In FIG. 6A or FIG. 6B, the data identification information may be displayed as text, an icon, an image, an animation, or a flash.

Referring to FIG. 6C, if a menu item corresponding to a photo file list view is selected via a menu search, the mobile terminal 100 may display a plurality of data links 621-626 associated with image files in the form of a thumbnail. Note, the data links for the image files are not limited to data links associated with image files as illustrated in FIG. 6C and may be associated with other file types.

Figure 7A:
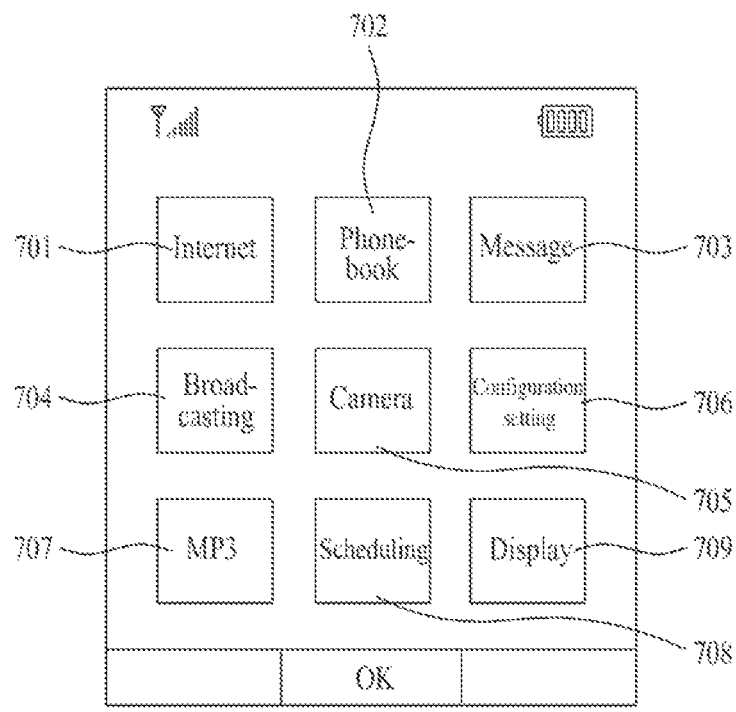
FIG. 7A and FIG. 7B illustrate screen configurations for displaying an image including data item identification information as a data link item according to one embodiment of the present invention.
Figure 7B:
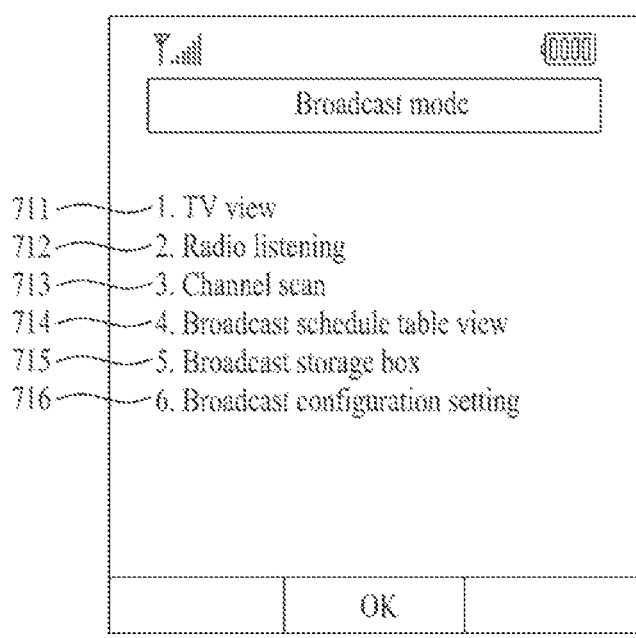

FIG. 7A and FIG. 7B illustrate screen configurations of displaying an image including data item identification information as a data link item.

Referring to FIG. 7A, when entering a menu item search mode, the mobile terminal 100 may display data links 701-709 associated with menu item identification information for a plurality of menu items.

If a broadcast 704, as illustrated in FIG. 7B, is selected from the menu item identification information illustrated in FIG. 7A, the mobile terminal 100 may display data links 711-716 associated with identification information for a plurality of sub-menu items associated with the broadcast.

The menu item identification information illustrated in FIG. 7A or FIG. 7B may be displayed in various forms, such as, text, an icon, an image, an animation, or flash.

FIG. 8 illustrates a screen configuration of displaying a webpage on a display window if a preview command signal for a web link is input.

As illustrated in FIG. 8, the mobile terminal 100 may receive a first preview command signal via a simultaneous touch input on a first web link 501 displayed on a homepage 504. In this example, the simultaneous touch input is executed via two pointers, such as a thumb and a forefinger, on the first web link 501 (FIG. 8(a)).

Subsequently, the mobile terminal 100 accesses a first website 505 associated with the first web link 501 while maintaining access to the homepage 504. Specifically, the mobile terminal 100 may display the homepage 504 while simultaneously displaying the first website 505 in a predetermined region, such as the first display window 810, of the homepage 504. According to the current embodiment, the first website 505 may be partially or fully displayed in the first display window 810 (FIG. 8(b)).

Accordingly, a user may check the first website 505 while maintaining a connection with an originally displayed webpage, homepage 504, without switching websites.

Furthermore, the mobile terminal 100 enables a preview mode if a simultaneous touch action to the first web link 501 is input (FIG. 8(a)). Additionally, if the simultaneous touch action to the first web link information 501 is re-input, the mobile terminal 100 may configure the first display window 810 if the simultaneous touch action to the first web link 501 is re-input (not shown).

Moreover, when a first preview command signal is input, if a first data link is a first data file identification information, the controller 180 executes a first data file corresponding to the first data identification information and may then display the program associated with the executed first data file in a first display window. Additionally, the controller 180 may display the first display window while maintaining a display of the object which included the first data file identification information.

FIGS. 9A to 9C illustrate screen configurations of displaying a program associated with an execution of a data file on a display window if a preview command signal for file identification information is input.

As illustrated in FIG. 9A, the mobile terminal 100 may receive a first preview command signal via a touch and drag input action input. Specifically, the first preview command signal may be received via a touch and drag input action input on a first video file identification information 601 included in a video file list, such that the touch and drag input action input is associated with a preview command, for example a touch and drag input action input in the right direction (FIG. 9A(a)).

While maintaining the display of the video file list, the mobile terminal 100 may display an image of a first video file corresponding to the first video file identification information 601 in a first display window 910 (FIG. 9A(b)).

As previously discussed, if a touch and drag action to the first video file identification information 601 in a right direction is input, FIG. 9A(a), the mobile terminal 100 sets a preview mode. The mobile terminal 100 may configure the first display window 910, illustrated in FIG. 9A(b), if the touch and drag action on the first video file identification information 601 in the right direction is re-input (not shown).

As illustrated in FIG. 9B, the mobile terminal 100 may receive a first preview command signal via a touch action having a specific shape. Specifically, first preview command signal may be received via a touch input action corresponding to a preview command for a first audio file identification information 611 displayed on a facet of a 3-dimensional polyhedron.

While maintaining the display of the 3-dimensional polyhedron, the mobile terminal 100 may display an image associated with the execution of a first audio file corresponding to the first audio file identification information 611 in a audio display window 920 (FIG. 9B(b)). In this example, the execution image of the first audio file may include play state information, such as a play position, control information, song title information, singer information, and composer information. Additionally, an audio signal of the first audio file may be output via the audio output module 152. Audio which is output as a result of the first preview command signal, may correspond to a full or partial output of the first audio file.

Additionally, if a touch action having a specific shape is input to the first audio identification information 611, FIG. 9B(a), the mobile terminal 100 sets a preview available mode. The mobile terminal 100 may then configure in the audio display window 920, FIG. 9B(b), if the touch input action having the specific shape is re-input (not shown in the drawing).

Referring to FIG. 9C, the mobile terminal 100 may receive a first preview command signal via a sequential multiple touch input action corresponding to a preview command on a first photo file identification information 621 (FIG. 9C(a)).

While maintaining the display of the photo file identification information, the mobile terminal 100 may display an image corresponding to the first photo file identification information 621 in a first display window 930 (FIG. 9C(b)).

As previously discussed, when the sequential multiple touch action is input to the first photo file identification information 621, FIG. 9C(a), the mobile terminal 100 sets a preview available mode. Additionally, the mobile terminal 100 may then configure first display window 930, FIG. 9C(b), if the sequential multiple touch action to the first photo file identification information 621 is re-input (not shown).

FIG. 10A and FIG. 10B illustrate screen configurations for displaying a menu item execution image on a display window if a preview command signal for menu item identification information is input.

As illustrated in FIG. 10A, receiving an input via two pointers on a phonebook 702 in a menu list (FIG. 10A(a)) may enable the mobile terminal 100 to display a list of sub-menu items belonging to the phonebook 702 in a first display window 1010 (FIG. 10A(b)). Specifically, the phonebook 702 may be displayed in a first display window 1010 if the received input is associated with a preview command signal, such as a simultaneous touch.

Moreover, the sub-menu items associated with the phonebook 702 may be fully or partially displayed. For example, with regard to a partial display, sub-menu items may be arranged and displayed in order of a frequency of use.

FIG. 10B illustrates a list of options associated with a "Broadcast mode" in a first display window 1010 (FIG. 10B(a)). Specifically, the mobile terminal 100 may display a broadcast program as illustrated in FIG. 10B(b) after receiving an input via two pointers associated with a preview command signal on a TV view 711 in a broadcast relevant menu item list (FIG. 10B(a)).

In this example (FIG. 10B(b)), the first display window 1020 may display a representative broadcast program of a prescribed broadcast channel, a broadcast program currently broadcast on a prescribed broadcast channel or a broadcast program separately provided for a preview on a prescribed broadcast channel.

Additionally, the mobile terminal 100 may enter a preview mode after receiving a simultaneous touch action on a menu, such as the TV view 711 of FIG. 10B(a). Furthermore, after receiving a second input of the simultaneous touch action the mobile terminal 100 may configure the first display window 1020 illustrated in FIG. 10B(b) [not shown]. Entering a preview mode, or configuring a first display window is not limited to the embodiment of a "Broadcast mode" as illustrated in FIG. 10B.

FIG. 11A and FIG. 11B illustrate screen configurations for displaying a data image on a display window if a preview command signal is input.

Referring to FIG. 11A, while displaying a received message which may include web link information 1101, the mobile terminal 100 may receive a simultaneous touch action input via two pointers on the web link information 1101 (FIG. 11A(a)).

The mobile terminal 100 may access a website corresponding to the web link information 1101 after receiving a simultaneous touch and drag input on the web link information 1101 via two pointers in which a distance between the two pointers increases (FIG. 11A(b)). The mobile terminal 100 may display the display window 1110 on a pre-determined region of the display.

As illustrated in FIG. 11B, while displaying a received message, the mobile terminal 100 may receive a simultaneous touch action input via two pointers on an attachment file 1102 attached to the received message (FIG. 11B(a)).

The mobile terminal 100 may display a content of the attachment file 1102 in a display window 1120 (FIG. 11B(b)) after receiving a simultaneous touch input on the attachment file 1102 via the two pointers in a manner which a distance between the two pointers increases. The mobile terminal 100 may display the display window 1120 on a pre-determined region of the display.

FIGS. 12A to 12C illustrate screen configurations for controlling a display window display according to a size adjusting signal.

Referring to FIG. 12A, the mobile terminal 100 may enlarge a first display window 810 and display a second display window 830 (FIG. 12A(b)) after receiving an input for increasing a distance between first and second pointers, such as increasing from d1 to d2 (FIG. 12A(a)).

In this example, the extent of the enlargement or shape of the first display window 810 may vary according to a distance which was increased between the touch points, a touch and drag speed, or a touch point position.

Referring to FIG. 12B, the mobile terminal 100 may reduce the size of a first display window 810 and display a second display window 820 (FIG. 12B(b)) after receiving an input for decreasing a distance between first and second pointers, such as decreasing from d4 to d3 (FIG. 12B(a)).

In this example, the extent of the reduction or shape of the second display window 820 may vary according to a distance which was decreased between the touch points, a touch and drag speed, or a touch point position. Additionally, the 'd4' distance should be greater than a predetermined limit.

Referring to FIG. 12C, the mobile terminal 100 may stop displaying a first display window 810 (FIG. 12C(b)) after receiving a narrowing action for decreasing a distance between first and second pointers, such as from d6 to d5, wherein d6 is less than or equal to a pre-determined length (FIG. 12C(a)).

According to an embodiment of the present invention, the controller 180 may stop displaying the first display window if a user input for a first display window is not received after a predetermined period after displaying a first display window.

Another embodiment of the present invention is explained with reference to the accompanying drawings.

Figure 13:
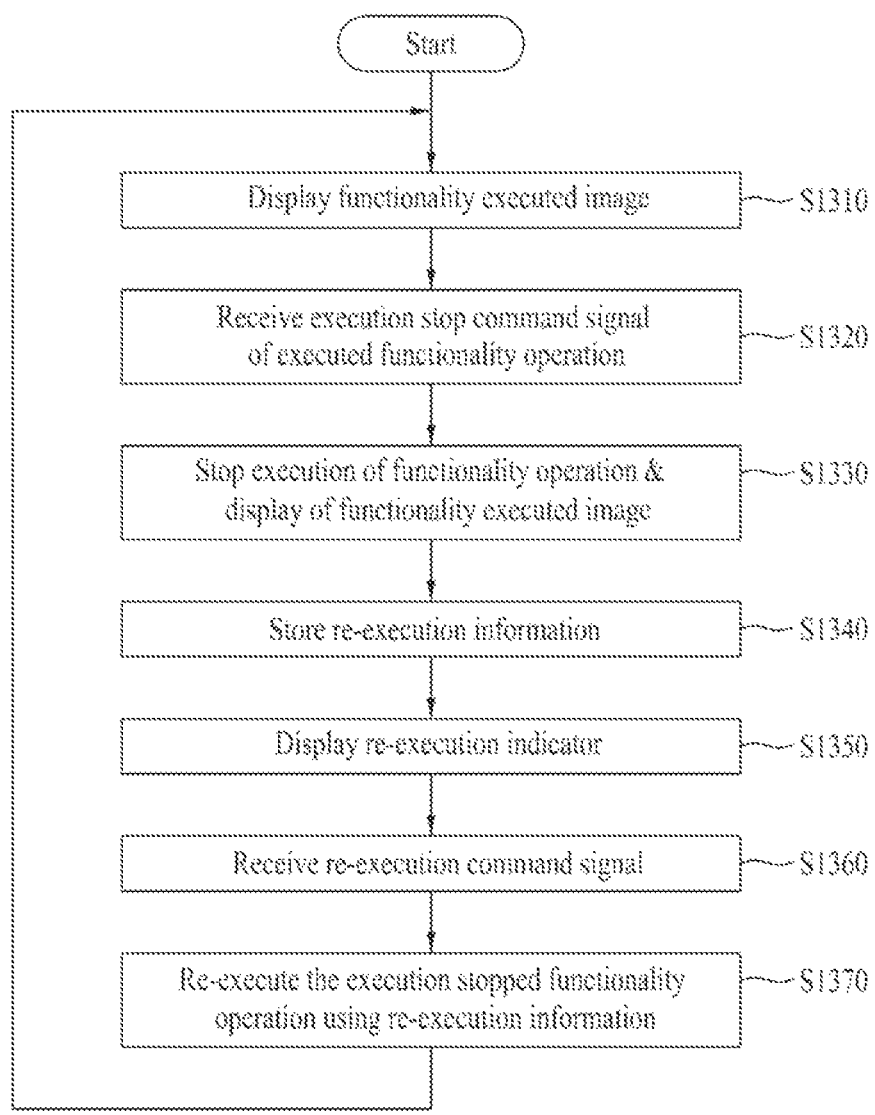
FIG. 13 is a second flowchart for a method of controlling a display in a mobile terminal according to one embodiment of the present invention.

FIG. 13 is a flowchart illustrating a method of controlling a display in a mobile terminal according to an embodiment of the present invention.

As illustrated in FIG. 13, the mobile terminal 100 displays a functionality execution image for an executed functionality operation on the touchscreen under the control of the controller 180 [S1310] after executing a functionality operation. The mobile terminal 100 may receive an input for an execution stop command signal for the functionality execution image displayed on the touchscreen [S1320].

The mobile terminal stops the execution of the executed functionality operation under the control of the controller 180 and stops displaying the functionality execution image displayed in step S1310 after receiving the input of the execution stop command signal in step S1320. Subsequently, the mobile terminal 100 stores re-execution information of the execution-stopped functionally operation in the memory 160 under the control of the controller 180 [S1340].

Moreover, the mobile terminal 100 displays a re-execution indicator corresponding to the execution stopped functionality operation on a prescribed region of the screen under the control of the controller 180 [S1350]. The mobile terminal 100 may receive an input for a re-execution command signal for the execution stopped functionality operation using the re-execution indicator displayed in step S1350 [S1360]. Subsequently, the mobile terminal 100 re-executes the functionality operation corresponding to the re-execution command signal which was input in step S1360 among the execution stopped functionality operations under the control of the controller 180 [S1370]. In this example, the controller 180 is able to perform step S1370 using the stored re-execution information.

In the embodiment described above, the functionality operation may include an operation such as, website access, message writing, video output, broadcast signal output, or location navigation. Moreover, the functionality operation may include operations related to all applications which may be executed by the mobile terminal 100, and is not limited to the aforementioned operations.

The functionality execution image may include at least one of a website access image, a message write image, a video output image, a broadcast output image, and a location navigation image associated with each of the above-mentioned functionality operations.

The execution stop command signal may include a signal for ending the execution of the executed functionality operation in progress. For example, the execution stop command signal may be processed if a user touch action corresponding to the execution stop command is input via the touchscreen. Specifically, the user touch action corresponding to the execution stop command may include one of a pre-determined touch time, a specific touch pattern, or a simultaneous touch and drag action by first and second pointers to reduce a touch point distance between the first and second pointers to be equal to or less than a pre-determined distance. According to another embodiment, the execution stop command signal may be input via a key manipulation.

In the current embodiment, the re-execution information may include information for displaying the functionality execution image which was displayed prior to the execution stop. Additionally, the re-execution information may include the information for displaying the updated functionality execution image if the functionality execution image displayed prior to the execution stop is updated after the execution stop.

For example, if the execution stop is initiated while accessing a website, the re-execution information may include address information, representative image information, schematic information, or access stopped time information of the execution stop timing point of the website access operation. If the execution stopped functionality operation is a message writing operation, the re-execution information includes at least one of identification information, content information, recipient information, or write stop time information of the execution stop timing point of the message write operation. If the execution stopped functionality operation is a video output operation, the re-execution information may include file information, play stop position information, or play stop time information for the execution stop timing point of the video play operation. If the execution stopped functionality operation is a broadcast signal output operation, the re-execution information may include identification information, broadcast channel information, output stop position information, or output stop time information for the execution stop timing point of the broadcast signal output operation.

In this example, the re-execution indicator may refer to an input region on the screen to receive a command for a re-execution of the execution stopped functionality operation. Information on the execution stopped functionality operation may be displayed in the re-execution indicator. This displayed information may be extracted from the re-execution information.

For example, the re-execution indicator may be displayed in the form of a widget or a key. The information displayed in the re-execution indicator may be represented as a text, an icon, an image, a video, or a flash.

In the following description, step S1320 and step S1350 are explained in detail with reference to the accompanying drawings. In the following description, assume that a user action for an execution stop command signal input is a narrowing action.

In step S1360 of FIG. 13, the mobile terminal 100 may receive an input for selecting a re-execution indicator associated with a functionality operation. In this example, the re-execution indicator may be selected via a touch, a key manipulation, or a mouse manipulation.

For example, if a re-execution indicator associated with an execution stopped website is selected, the controller 180 re-accesses the execution stopped website using stored address information and may display the re-accessed website. This example will be explained in detail with reference to FIG. 18A.

Figure 14A:
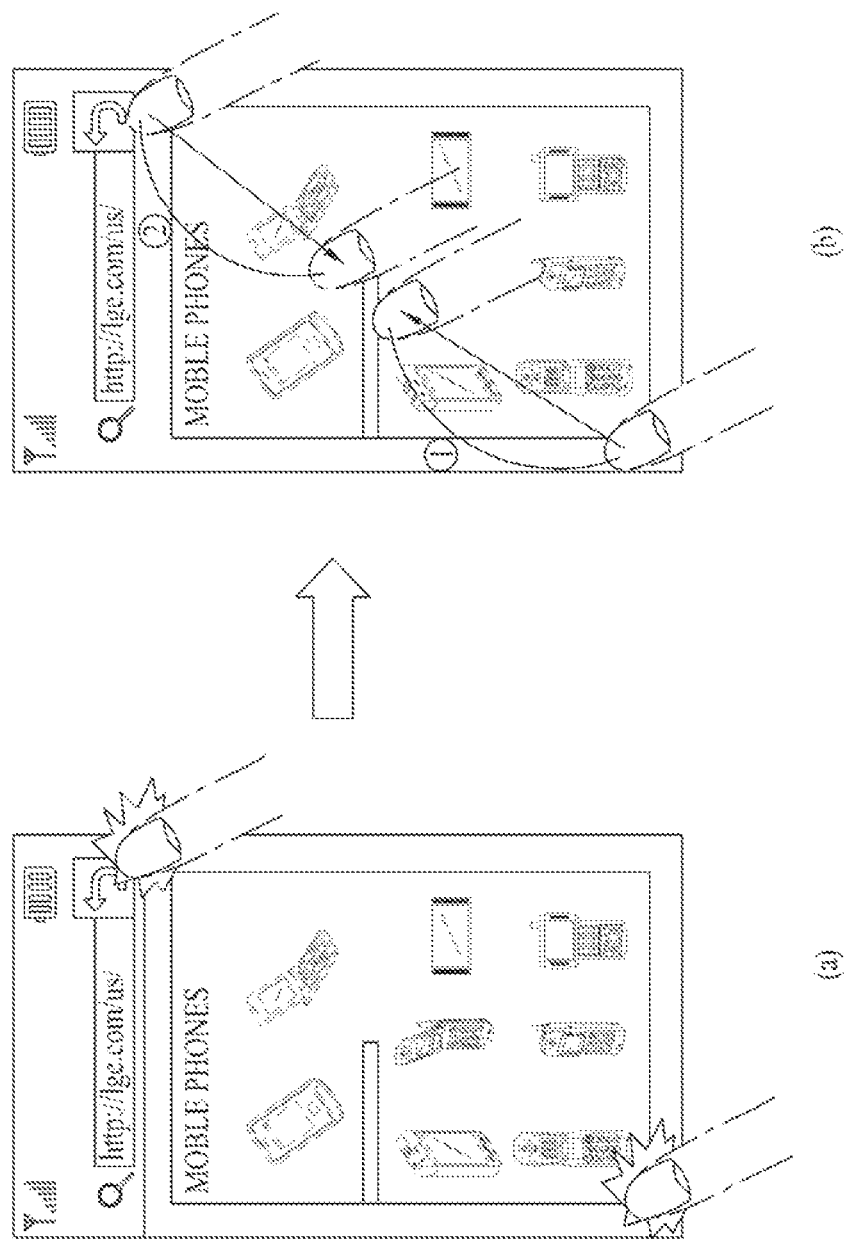
FIG. 14A and FIG. 14B are diagrams for screen configurations of displaying a re-execution indicator if an execution step command signal for a website access operation is inputted according to one embodiment of the present invention.
Figure 14B:
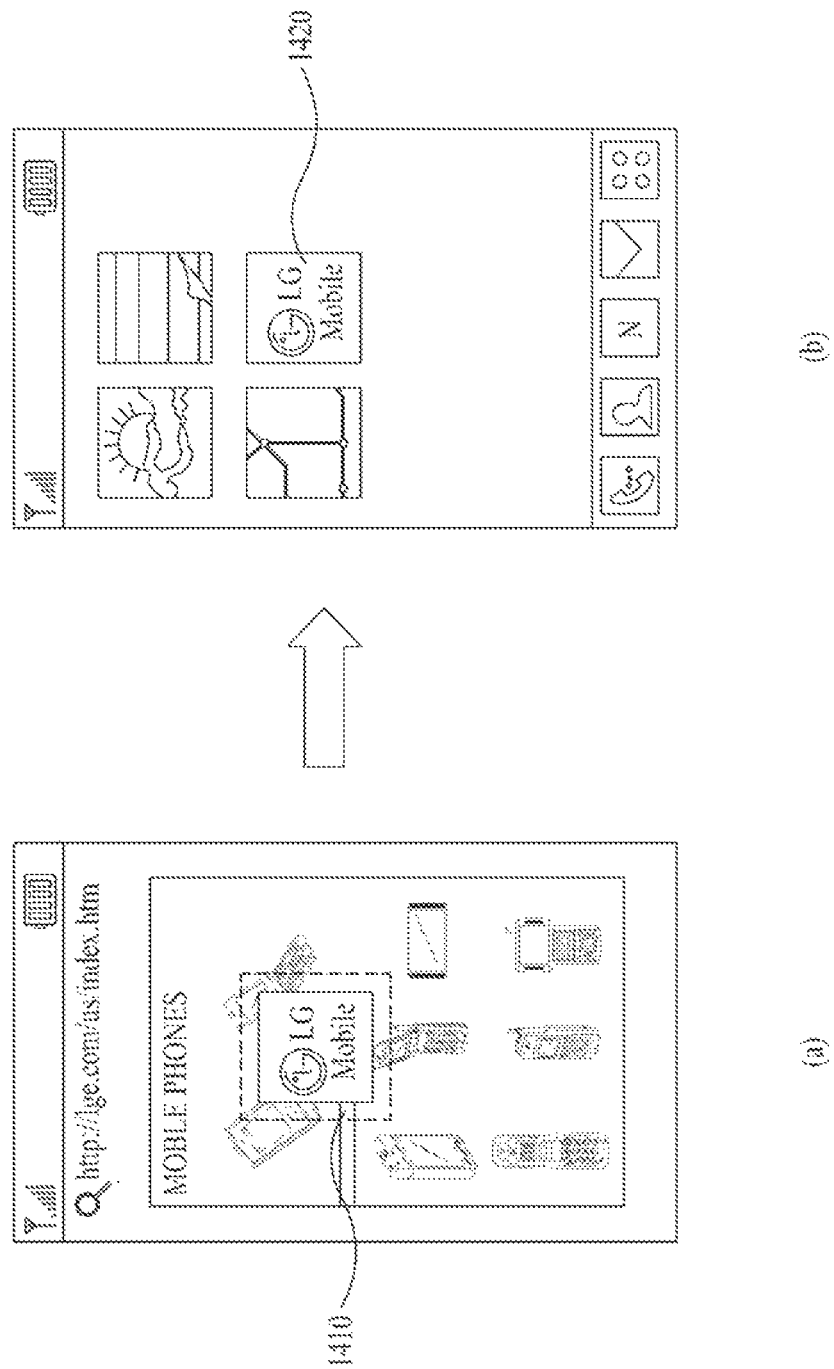

FIG. 14A and FIG. 14B illustrate screen configurations of displaying a re-execution indicator if an execution stop command signal for a website access operation is input.

A narrowing action may be input as an execution stop command signal while a webpage is displayed (FIG. 14A). Subsequently, the mobile terminal 100 receives an execution stop command signal corresponding to the narrowing action input and then displays a re-execution indicator 1410 (FIG. 14B(a)) while maintaining access to the webpage. According to another embodiment, after the access to the webpage has ended, when a standby image or a widget icon for re-execution is displayed, the mobile terminal may display a re-execution indicator 1420 (FIG. 14B(b)).

In this example, the re-execution indicator 1410 and 1420 may display identification information, such as address information, name, icon, or representative image, of the execution stopped website.

Figure 15A:
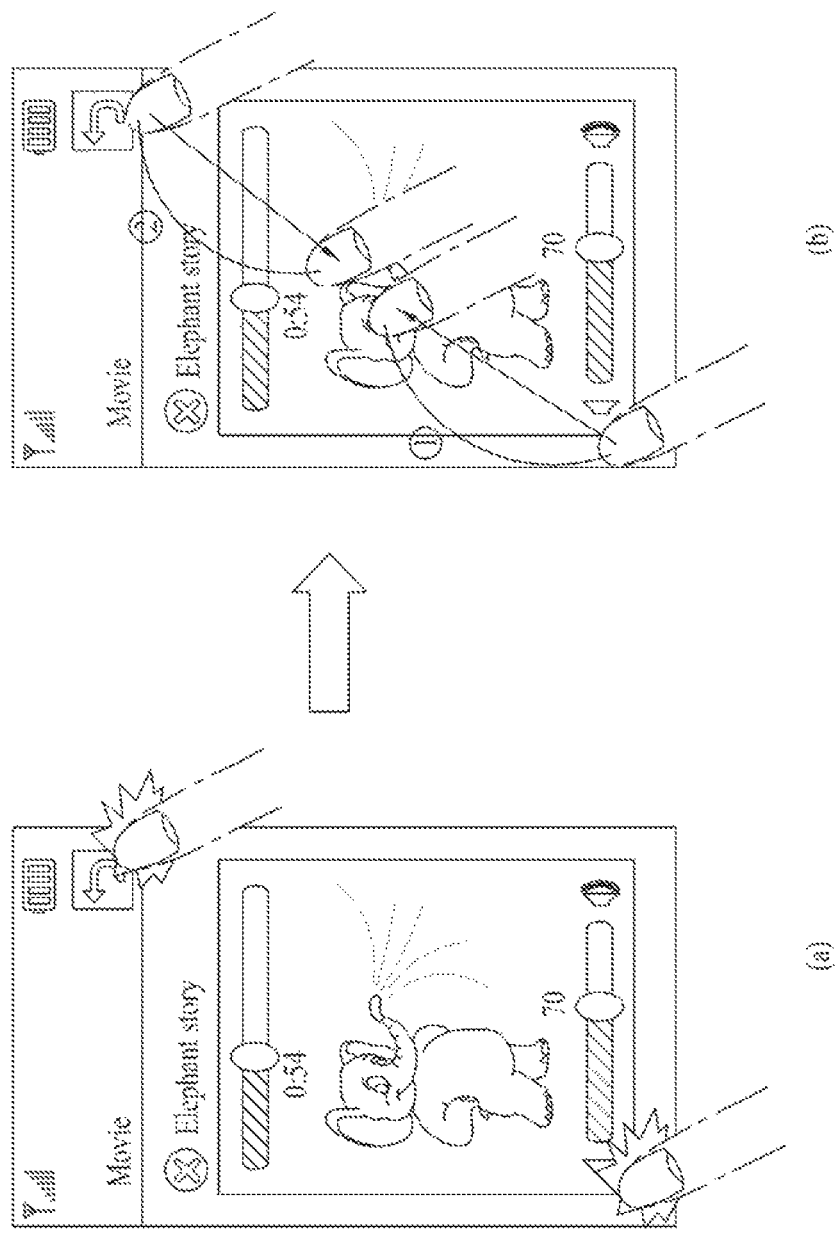
FIG. 15A and FIG. 15B are diagrams for screen configurations of displaying a re-execution indicator if an execution step command signal for a video play operation is inputted according to one embodiment of the present invention.
Figure 15B:
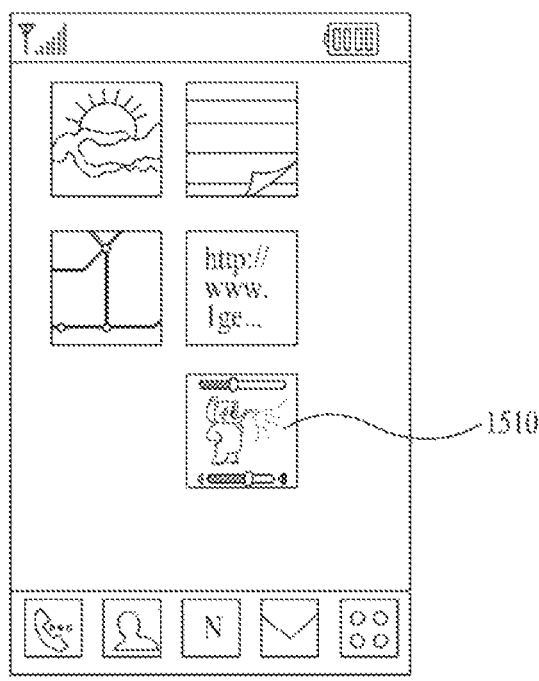

FIG. 15A and FIG. 15B illustrate screen configurations for displaying a re-execution indicator after receiving an input for an execution step command signal of a video play operation.

In a video play mode, a narrowing action may be input to the touchscreen as an execution stop command signal (FIG. 15A). After ending the video play operation, when a standby image or when a widget icon for state re-execution is displayed, the mobile terminal may display a re-execution indicator 1510 (FIG. 15B).

In this example, the re-execution indicator 1510 may display identification information, such as a name, icon, or representative image, of the stopped video.

Figure 16B:
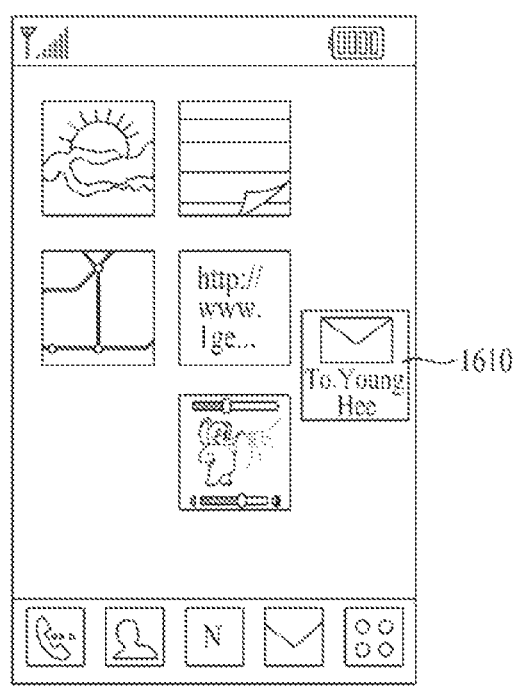

FIG. 16A and FIG. 16B illustrate screen configurations for displaying a re-execution indicator if an execution stop command signal for a message write operation is input.

In a message write mode, a narrowing action may be input on the touchscreen as an execution stop command signal (FIG. 16A). After ending the message write operation, when a standby image or a widget icon for state re-execution is displayed, the mobile terminal may display a re-execution indicator 1610 (FIG. 16B).

In this example, the re-execution indicator 1610 may display recipient information, stop time information, or content information for the write-stopped message.

Figure 17B:
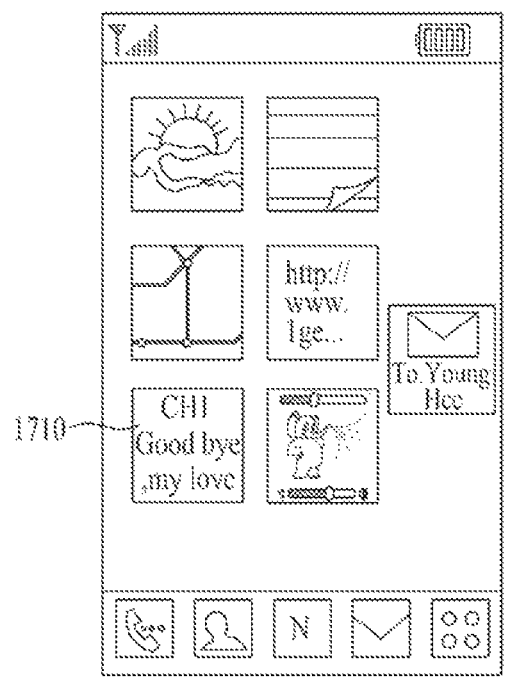

FIG. 17A and FIG. 17B illustrate screen configurations for displaying a re-execution indicator if an execution step command signal for a broadcast signal output operation is input.

In a broadcast output mode, a narrowing action may be input to the touchscreen as an execution stop command signal (FIG. 17A). After ending the broadcast output operation, when a standby image or a widget icon for a state re-execution is displayed, the mobile terminal may display a re-execution indicator 1710 (FIG. 17B).

In this example, the re-execution indicator 1710 may display name information of the output-stopped broadcast program, corresponding broadcast channel information, or output-stopped time information.

Additionally, identification information indicating a functionality operation associated with a corresponding re-execution indicator may be included in the re-execution indicator 1410, 1510, 1610 or 1710.

As illustrated in FIG. 18A, if a re-execution indicator 1420 for a website is selected by a user (FIG. 18A(a)), the controller 180 may re-execute a website access operation indicated by the selected re-execution indicator 1420 (FIG. 18A(b)).

Referring to FIG. 18B, if a re-execution indicator 1510 of a stopped website video output is selected by a user (FIG. 18B(a)), the controller 180 may re-execute a video play operation associated with the selected re-execution indicator 1510 (FIG. 18B(b)).

In this example (FIG. 18B), the controller 180 identifies a stopped video via file information indicating a stop timing point and may then play the video from the stop timing point after a re-execution command for a stopped video output is input. In this example, the stop timing point may be checked via play stop position information in the re-execution information of the identified video.

FIG. 18C illustrates that after a re-execution indicator 1610 of a stopped message write function is selected by a user (FIG. 18C(a)), the controller 180 may re-execute a message write function associated with the selected re-execution indicator 1610 (FIG. 18C(b)).

As illustrated in FIG. 18C, the controller 180 identifies a write stopped message via identification information of the message being written at an execution stop timing point and may then display a write window of the identified message after a re-execution command for an stopped message write function is input. In this example, content of a message written prior to the execution stop timing point may be included in the write window of the identified message.

Referring to FIG. 18D, if a re-execution indicator 1710 of a stopped broadcast output is selected by a user (FIG. 18D(a)), the controller 180 may re-execute a broadcast output associated with the selected re-execution indicator 1710 (FIG. 18D(b)). If a re-execution command signal for a stopped broadcast signal output is input, the controller 180 identifies an execution stop timing point via identification information of the stopped broadcast program and may then output the identified broadcast program. Additionally, according to another embodiment, the controller 180 may output a random broadcast program.

According to another embodiment of the present invention, an execution stopped functionality operation is indicated by a re-execution indicator, a bookmark, or user menu, comprising menu items or a functionality operation storage box.

According to another embodiment of the present invention, if an execution stopped operation is re-executed, corresponding re-execution information may be deleted from the memory 160 and a corresponding re-execution indicator may not be displayed any further, under the control of the controller 180.

According to one embodiment of the present invention, the above-described display controlling method can be implemented in a program recorded medium as computer-readable codes. The computer-readable media include all types of recording devices in which data readable by a computer system are stored. The computer-readable media include ROM, RAM, CD-ROM, magnetic tapes, floppy discs, optical data storage devices, and the like for example and also include carrier-wave type implementations, such as transmission via the Internet.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
    a touchscreen configured to display a window for writing a message, the window including a name of a recipient for the message and a content of the message;
    a memory; and
    a controller configured to:
    when a first point and a second point of the displayed window are simultaneously touched via the touchscreen and a distance between the touched first and second points of the displayed window is decreased to be less than a predetermined distance, stop both a write operation of the message and the displaying of the window;
    cause the touchscreen to display a standby screen instead of the window when the displaying of the window is stopped;
    store re-display information on the display stopped window in the memory;
    create an item for re-displaying the display stopped window; and
    cause the touchscreen to display the item on the standby screen,
    wherein the item represents the name of the recipient, stop time information and the content of the message.

2. The mobile terminal of claim 1, wherein the item is displayed as a widget or a key.

3. The mobile terminal of claim 1, wherein when the item is touched via the touchscreen, the controller is further configured to cause the touchscreen to re-display the display stopped window using the stored re-display information.

4. A method of controlling an access of a webpage in a mobile terminal, the method comprising:
    displaying, on a touchscreen of the mobile terminal, a window for writing a message, the window including a name of a recipient for the message and a content of the message;
    when a first point and a second point of the displayed window are simultaneously touched via the touchscreen and a distance between the touched first and second points of the displayed window is decreased to be less than a predetermined distance, stopping both a write operation of the message and the displaying of the window;
    displaying, on the touchscreen, a standby screen instead of the window when the displaying of the window is stopped;
    storing, in a memory of the mobile terminal, re-display information on the display stopped window;
    create an item for re-displaying the display stopped window; and
    displaying the item on the standby screen,
    wherein the item represents the name of the recipient, stop time information and the content of the message.

5. The method of claim 4, further comprising:
    when the item is touched via the touchscreen, re-display the display stopped window using the stored re-display information.

* * * * *